United States Patent
Horiuchi et al.

(10) Patent No.: US 11,765,740 B2
(45) Date of Patent: Sep. 19, 2023

(54) BASE STATION, TERMINAL, TRANSMISSION METHOD, AND RECEPTION METHOD

(71) Applicant: Sun Patent Trust, New York, NY (US)

(72) Inventors: Ayako Horiuchi, Kanagawa (JP); Hidetoshi Suzuki, Kanagawa (JP); Kazuki Takeda, Kanagawa (JP); Lilei Wang, Beijing (CN)

(73) Assignee: Sun Patent Trust, New York, NY (US)

( * ) Notice: Subject to any disclaimer, the term of this patent is extended or adjusted under 35 U.S.C. 154(b) by 0 days.

(21) Appl. No.: 17/568,506

(22) Filed: Jan. 4, 2022

(65) Prior Publication Data

US 2022/0132479 A1    Apr. 28, 2022

Related U.S. Application Data

(63) Continuation of application No. 16/577,211, filed on Sep. 20, 2019, now Pat. No. 11,252,711, which is a
(Continued)

(51) Int. Cl.
*H04W 72/23* (2023.01)
*H04L 5/00* (2006.01)
(Continued)

(52) U.S. Cl.
CPC .......... *H04W 72/23* (2023.01); *H04L 5/0053* (2013.01); *H04W 72/0446* (2013.01); *H04W 72/21* (2023.01); *H04W 84/042* (2013.01)

(58) Field of Classification Search
CPC .. H04W 72/23; H04W 72/0446; H04W 72/21
See application file for complete search history.

(56) References Cited

U.S. PATENT DOCUMENTS

| 8,599,782 B2 | 12/2013 | Chung et al. |
| 9,107,162 B2 | 8/2015 | Zhu et al. |

(Continued)

FOREIGN PATENT DOCUMENTS

| CN | 102638892 A | 8/2012 |
| WO | 2011/112681 A1 | 9/2011 |

(Continued)

OTHER PUBLICATIONS

3GPP TS 36.213 V11.1.0, "$3^{rd}$ Generation Partnership Project; Technical Specification Group Radio Access Network; Evolved Universal Terrestrial Radio Access (E-UTRA); Physical layer procedures (Release 11)," Dec. 2012, 160 pages.
(Continued)

*Primary Examiner* — Raj Jain
(74) *Attorney, Agent, or Firm* — Seed IP Law Group LLP

(57) ABSTRACT

Disclosed is a base station capable of appropriately configuring a resource on which an EPDCCH is located when soft combining is applied. The base station includes a configuration section that configures an EPDCCH set in a plurality of subframes, where the EPDCCH set is formed of ECCEs to which control information (assignment information) transmitted over the plurality of subframes is assigned. The base station includes an assignment section that assigns the control information to any of the ECCEs in each of the plurality of subframes.

20 Claims, 15 Drawing Sheets

Related U.S. Application Data continuation of application No. 15/710,676, filed on Sep. 20, 2017, now Pat. No. 10,462,773, which is a continuation of application No. 15/385,002, filed on Dec. 20, 2016, now Pat. No. 9,814,034, which is a continuation of application No. 14/443,980, filed as application No. PCT/CN2013/071085 on Jan. 29, 2013, now Pat. No. 9,565,669.

(51) Int. Cl.
*H04W 72/0446* (2023.01)
*H04W 72/21* (2023.01)
*H04W 84/04* (2009.01)

(56) References Cited

U.S. PATENT DOCUMENTS

| | | |
|---|---|---|
| 9,301,291 B2 | 3/2016 | Koorapaty et al. |
| 9,363,049 B2 | 6/2016 | Li et al. |
| 9,565,669 B2 | 2/2017 | Horiuchi et al. |
| 9,591,635 B2 | 3/2017 | Sartori et al. |
| 2011/0075611 A1 | 3/2011 | Choi |
| 2011/0176443 A1 | 7/2011 | Astely et al. |
| 2011/0222491 A1 | 9/2011 | Vajapeyam et al. |
| 2012/0063413 A1* | 3/2012 | Kroener ............ H04W 72/04 370/329 |
| 2012/0327855 A1 | 12/2012 | Lee et al. |
| 2013/0012252 A1 | 1/2013 | Suzuki et al. |
| 2013/0021988 A1 | 1/2013 | Chen |
| 2013/0044722 A1 | 2/2013 | Kang et al. |
| 2013/0163553 A1 | 6/2013 | Lee et al. |
| 2013/0182627 A1 | 7/2013 | Lee et al. |
| 2013/0208692 A1 | 8/2013 | Seo et al. |
| 2013/0223298 A1 | 8/2013 | Ahn et al. |
| 2013/0229958 A1 | 9/2013 | Sagae et al. |
| 2013/0250847 A1 | 9/2013 | Lee et al. |
| 2013/0295949 A1* | 11/2013 | Seo ............ H04W 72/27 455/452.1 |
| 2013/0301542 A1 | 11/2013 | Krishnamurthy et al. |
| 2013/0322397 A1 | 12/2013 | Lee et al. |
| 2013/0329686 A1 | 12/2013 | Kim et al. |
| 2013/0329688 A1 | 12/2013 | Yang et al. |
| 2014/0003387 A1 | 1/2014 | Lee et al. |
| 2014/0010127 A1 | 1/2014 | Cheng et al. |
| 2014/0016596 A1 | 1/2014 | Kim et al. |
| 2014/0036803 A1 | 2/2014 | Park |
| 2014/0036856 A1 | 2/2014 | Park |
| 2014/0071864 A1 | 3/2014 | Seo et al. |
| 2014/0071952 A1 | 3/2014 | Kim et al. |
| 2014/0078983 A1 | 3/2014 | Park et al. |
| 2014/0078987 A1 | 3/2014 | Park et al. |
| 2014/0092794 A1 | 4/2014 | Yang et al. |
| 2014/0098761 A1 | 4/2014 | Lee et al. |
| 2014/0169328 A1 | 6/2014 | Ahimezawa et al. |
| 2014/0185576 A1 | 7/2014 | Lei et al. |
| 2014/0192730 A1 | 7/2014 | Seo et al. |
| 2014/0233469 A1 | 8/2014 | Seo et al. |
| 2014/0301343 A1 | 10/2014 | Park et al. |
| 2014/0328333 A1 | 11/2014 | Seo et al. |
| 2014/0334395 A1 | 11/2014 | Lee et al. |
| 2014/0341145 A1 | 11/2014 | Nakashima et al. |
| 2014/0341146 A1 | 11/2014 | Nakashima et al. |
| 2015/0110031 A1 | 4/2015 | Takeda et al. |
| 2015/0139104 A1 | 5/2015 | Seo |
| 2015/0181573 A1 | 6/2015 | Takeda et al. |
| 2015/0245323 A1 | 8/2015 | You et al. |
| 2015/0270931 A1 | 9/2015 | Sun et al. |
| 2015/0271790 A1 | 9/2015 | Lee et al. |
| 2015/0280876 A1 | 10/2015 | You et al. |
| 2015/0296488 A1 | 10/2015 | Shimezawa et al. |
| 2015/0304993 A1 | 10/2015 | Shimezawa et al. |
| 2015/0304995 A1 | 10/2015 | Yi et al. |
| 2015/0341923 A1 | 11/2015 | Yang et al. |
| 2015/0359003 A1 | 12/2015 | Kim et al. |
| 2016/0165640 A1 | 6/2016 | Yang et al. |
| 2016/0338029 A1* | 11/2016 | Fan ............ H04W 72/23 |
| 2016/0353420 A1 | 12/2016 | You et al. |
| 2018/0255565 A1* | 9/2018 | Guan ............ H04W 72/12 |
| 2020/0015211 A1 | 1/2020 | Horiuchi et al. |
| 2022/0132479 A1* | 4/2022 | Horiuchi ............ H04W 72/23 |

FOREIGN PATENT DOCUMENTS

| | | |
|---|---|---|
| WO | 2012/157981 A2 | 11/2012 |
| WO | 2012/169800 A2 | 12/2012 |

OTHER PUBLICATIONS

Alcatel-Lucent, Alcatel-Lucent Shanghai Bell, "Remaining aspects of Quasi-co-located Antenna Ports," R1-124409, Agenda Item: 7.4.1, 3GPP TSG-RAN1 Meeting #70bis, San Diego, U.S.A., Oct. 8-12, 2012, 4 pages.

Alcatel-Lucent Shanghai Bell, Alcatel Lucent, "PHICH Enhancements," R1-114067, 3GPP TSG RAN WG1 Meeting #67, San Francisco, USA, Nov. 14-18, 2011, 3 pages.

Catt, " Design of enhanced PDCCH in Rel-11," R1-112119, 3GPP TSG RAN WG1 Meeting #66, Agenda Item: 6.6.2.2, Athens Greece, Aug. 22-26, 2011, 4 pages.

Ericsson, ST-Ericsson, "PUCCH resource allocation for ePDCCH," R1-124156, Agenda Item: 7.5.7, 3GPP TSG-RAN WG1 Meeting #70bis, San Diego, U.S.A., Oct. 8-12, 2012, 5 pages.

Fujitsu, "Antenna ports for ePDCCH detection," Rl-121191, 3GPP TSG RAN WG1 Meeting #68bis, Agenda Item: 7.6.1, Jeju, Korea, Mar. 26-30, 2012, 4 pages.

International Search Report, dated Nov. 7, 2013, for corresponding International Application No. PCT/CN2013/071085, 2 pages.

MediaTek Inc., "Coverage Analysis of Downlink Control Channel and Enhancement Techniques for MTC UEs," R1-130221, Agenda Item 7.3.4, 3GPP TSG RAN WG1 Meeting #72, St. Julian's, Malta, Jan. 28-Feb. 1, 2013, 8 pages.

New Postcom, "Discussion on restriction on maximum number of transport channel bits," R1-124225, 3GPP TSG RAN WG1 Meeting #70bis, Agenda item: 7.5.9, San Diego, USA, Oct. 8-12, 2012, 3 pages.

NTT Docomo, "Design Principle for E-PDCCH Multiplexing," R1-121976, 3GPP TSG RAN WG1 Meeting #69, Agenda Item: 7.6.4, Prague, Czech Republic, May 21-25, 2012, 3 pages.

Samsung, "PUCCH resource allocation for TDD EPDCCH," R1-124384, 3GPP TSG RAN WG1 #70bis, Agenda Item: 7.5.7, San Diego, USA, Oct. 8-12, 2012, 4 pages.

ZTE, "Consideration on enhanced PDCCH structure," R1-120313, 3GPP TSG RAN WG1 Meeting #68, Agenda Item: 7.6.2, Dresden, Germany, Feb. 6-10, 4 pages.

Huawei, HiSilicon, "Periodic CQI/PMI/RI reporting for CA," R1-105122, Agenda Item: 6.2.1.2, 3GPP TSG RAN WG1 meeting #62bis, Xi'an, China, Oct. 11-15, 2010, 6 pages.

Panasonic, "EPDCCH search space and aggregation levels," R1-124241, Agenda Item: 7.5.2, 3GPP TSG RAN WG1 Meeting #70bis, San Diego, USA, Oct. 8-12, 2012, 7 pages.

MediaTek Inc., "On Required System Functionalities for MTC UEs Operating in Enhanced Coverage Mode," R1-130218, Agenda Item: 7.3.4, 3GPP TSG RAN WG1 Meeting #72, St. Julian's Malta, Jan. 28-Feb. 1, 2013, 7 pages.

* cited by examiner (PRIOR ART) FIG. 1

| Number of PRB pairs | Number of PDCCH candidates | | | | |
|---|---|---|---|---|---|
| | L=1 | L=2 | L=4 | L=8 | L=16 |
| 2 | [8] | [4] | [2] | [1] | [0] |
| 4 | [4] | [5] | [4] | [2] | [1] |
| 8 | [4] | [4] | [4] | [2] | [2] |

FIG. 9A

| Number of PRB pairs | Number of PDCCH candidates For soft combining (K1) | | | | | Number of PDCCH candidates For non soft combining (K2) | | | | |
|---|---|---|---|---|---|---|---|---|---|---|
| | L=1 (L=2) | L=2 (L=4) | L=4 (L=8) | L=8 (L=16) | L=16 (L=32) | L=1 | L=2 | L=4 | L=8 | L=16 |
| 2 | [4] | [2] | [1] | [1] | [0] | [4] | [2] | [1] | [0] | [0] |
| 4 | [2] | [3] | [2] | [1] | [1] | [2] | [2] | [2] | [1] | [0] |
| 8 | [2] | [2] | [2] | [1] | [1] | [2] | [2] | [2] | [1] | [1] |

FIG. 9B

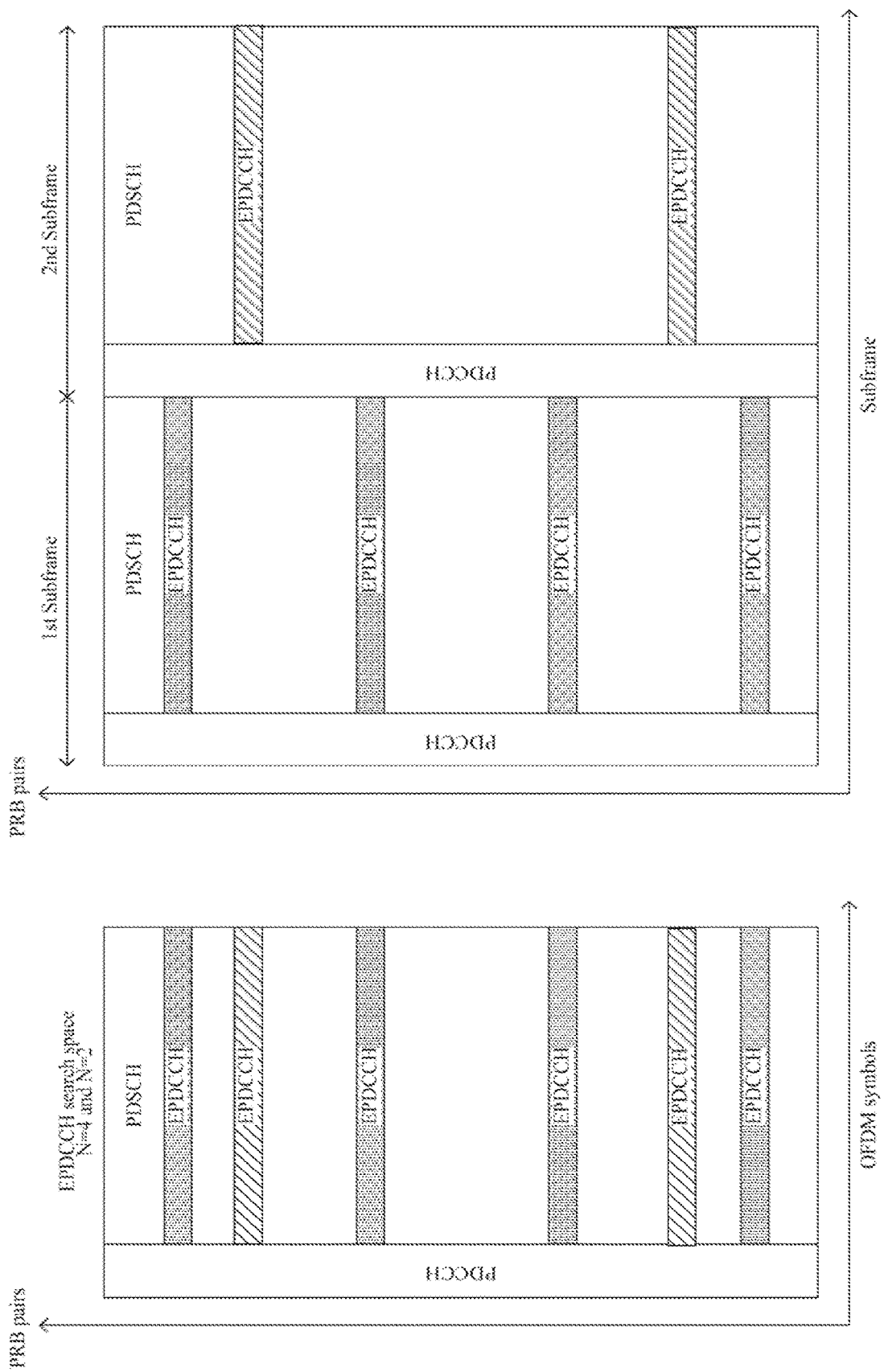

| Number of PRB pairs | Number of EPDCCH candidates For case 3 | | | | |
|---|---|---|---|---|---|
| | L=1 (L=2) | L=2 (L=4) | L=4 (L=8) | L=8 (L=16) | L=16 (L=32) |
| 2 | [4] | [2] | [1] | [1] | [0] |
| 4 | [2] | [3] | [2] | [1] | [1] |
| 8 | [2] | [2] | [2] | [1] | [1] |

FIG. 13

| ECCE# | PRB pair #0 | PRB pair #1 | PRB pair #2 | PRB pair #3 | PRB pair #4 | PRB pair #5 | PRB pair #6 | PRB pair #7 |
|---|---|---|---|---|---|---|---|---|
| 0 | EREG #0 | | EREG #4 | | EREG #8 | | EREG #12 | |
| 1 | | EREG #0 | | EREG #4 | | EREG #8 | | EREG #12 |
| 2 | EREG #12 | | EREG #0 | | EREG #4 | | EREG #8 | |
| 3 | | EREG #12 | | EREG #0 | | EREG #4 | | EREG #8 |
| 4 | EREG #8 | | EREG #12 | | EREG #0 | | EREG #4 | |
| 5 | | EREG #8 | | EREG #12 | | EREG #0 | | EREG #4 |
| 6 | EREG #4 | | EREG #8 | | EREG #12 | | EREG #0 | |
| 7 | | EREG #4 | | EREG #8 | | EREG #12 | | EREG #0 |
| 8 | EREG #1 | | EREG #5 | | EREG #9 | | EREG #13 | |

FIG. 15

BASE STATION, TERMINAL, TRANSMISSION METHOD, AND RECEPTION METHOD

TECHNICAL FIELD

The claimed invention relates to a base station, a terminal, a transmission method, and a reception method.

BACKGROUND ART

In recent years, it has become common to transmit not only speech data but also a large amount of data such as still image data and moving image data along with the adoption of multimedia information in cellular mobile communication systems. In addition, studies have been actively carried out to achieve a high transmission rate using a wide radio band, Multiple-Input Multiple-Output (MIMO) transmission technology, and interference control technique in Long Term Evolution Advanced (LTE-Advanced).

In LTE-Advanced, an enhanced control channel region called Enhanced PDCCH (EPDCCH), which is an enhanced version of Physical Downlink Control CHannel (PDCCH) used for control signals, has been designed. EPDCCH is located in a resource region to which downlink data is assigned (i.e., Physical Downlink Shared Channel (PDSCH) region). Base stations can configure each terminal (sometimes called "User Equipment (UE)") with a frequency resource (e.g., resource block (RB)) in a resource region in which EPDCCH is located (EPDCCH region) and transmit signals to the terminal. Thus, it is made possible to achieve transmission power control for control signals transmitted to a terminal located near a cell edge, or interference control for interference caused by a cell of the base station to another cell or interference control for interference caused by another cell to the cell of the base station due to the control signals to be transmitted.

Each RB has 12 subcarriers in the frequency domain and a width of 0.5 msec in the time domain. The unit of two RBs combined in the time domain is called an RB pair. More specifically, each RB pair has 12 subcarriers in the frequency domain and a width of 1 msec in the time domain. Moreover, when an RB pair represents a block of 12 subcarriers on the frequency axis, the RB pair may be simply called an RB. An RB pair is also called a Physical RB pair (PRB pair) on the physical layer. In addition, the unit defined by one subcarrier and one OFDM symbol is a resource element (RE).

In an EPDCCH region, the units defined by dividing each PRB pair into 16 resources are called Enhanced Resource Element Groups (EREGs), and a resource unit formed of four or eight EREGs is called an Enhanced Control Channel Element (ECCE). The number of ECCEs forming EPDCCH transmitting one set of control signals is called an aggregation level (AL). A plurality of ALs can be configured for EPDCCH (see, Non-Patent Literature (hereinafter, referred to as "NPL") 1). In addition, an "EPDCCH candidate" is previously defined in each AL. The term, "EPDCCH candidate" as used herein refers to a candidate for a region to which control signals are mapped, and a plurality of EPDCCH candidates form a search space, which is a blind-decoding (monitoring) target of a terminal.

LTE-Advanced allows each terminal to be configured with a plurality of EPDCCH sets each formed of a set of ECCEs on which EPDCCH may be located (i.e., control information assignment candidate). Since the positions and number N of PRB pairs to be used are configured for each EPDCCH set, control signals are arranged more flexibly.

FIG. 1 illustrates an example of how EPDCCHs are mapped to resources. The ECCEs on which EPDCCHs are located are selected from the abovementioned plurality of EPDCCH candidates. In FIG. 1, EPDCCH #0 and EPDCCH #1 are each configured with aggregation level 1 (AL1) while EPDCCH #2 and EPDCCH #3 are configured with aggregation level 2 (AL2) and aggregation level 4 (AL4), respectively. In FIG. 1, EPDCCH #0 is located on ECCE #0, and EPDCCH #1 is located on ECCE #1, while EPDCCH #2 is located on ECCE #2 and ECCE #3, and EPDCCH #3 is located on ECCE #4, ECCE #5, ECCE #6, and ECCE #7. In addition, since each ECCE is located on four EREGs, the ECCE is divided into four pieces in FIG. 1. As illustrated in FIG. 1, in case of localized assignment, four EREGs are located on the same PRB pair, while four EREGs are located on different PRB pairs in case of distributed assignment.

Incidentally, as an EPDCCH assignment method, there are "localized assignment" in which EPDCCH is assigned locally to positions close to each other on the frequency band, and "distributed assignment" in which EPDCCH is assigned distributedly on the frequency band. "Localized assignment" is an assignment method used to obtain frequency scheduling gain and enables assignment of EPDCCH to a resource having good channel quality on the basis of channel quality information. "Distributed assignment" allows obtaining frequency diversity gain by distributing EPDCCH on the frequency axis. LTE-Advanced allows both of a search space for localized assignment and a search space for distributed assignment to be configured.

In LTE-Advanced, downlink (DL) assignment indicating DL data assignment and an uplink (UL) grant indicating UL data assignment are transmitted on PDCCH or EPDCCH. DL assignment reports that a resource in a subframe used to transmit this DL assignment is assigned to a terminal. Meanwhile, UL grant reports that a resource in a target subframe previously determined by the UL grant is assigned to a terminal.

NPL 1
3GPP TS 36.213 V11.1.0, "Physical layer procedures

SUMMARY OF INVENTION

Technical Problem

In LTE-Advanced, studies have been carried out to achieve a high transmission rate at hotspots by installing a small cell, which is a base station using low transmission power. For example, as a carrier frequency for operating a small cell, a high frequency such as 3.5 GHz has been considered as a candidate. When a high frequency radio band is used, however, attenuation increases as the transmission distance increases, although a higher transmission rate can be expected with a short distance. Accordingly, there is a problem in that the coverage area of a small cell decreases when a mobile communication system using a high frequency radio band is put into operation. In addition, in case of small cells, the restrictions on transmission power need to be taken into consideration as well, and the power usable for transmission per subframe is limited. The coverage area of a cell is determined by the range in which control signals can be received. Thus, a technique that increases the coverage area of control signals is required.

In this respect, application of soft combining (sometimes called "bundling") in which EPDCCH including control information is located over a plurality of subframes may be possible, for example. However, no studies have been carried out so far on any EPDCCH location method used when soft combining is applied.

It is an object of the claimed invention to provide a base station, a terminal, a transmission method, and a reception method that are capable of appropriately configuring resources on which EPDCCH is located when soft combining is applied.

Solution to Problem

A base station according to an aspect of the claimed invention includes: a configuration section that configures an Enhanced Physical Downlink Control Channel (EPDCCH) set in a plurality of subframes, the EPDCCH set being formed of Enhanced Control Channel Elements (ECCEs) to which control information transmitted over the plurality of subframes is assigned; and an assignment section that assigns the control information to any of the ECCEs on a Physical Resource Block (PRB) pair in each of the plurality of subframes.

A terminal according to an aspect of the claimed invention includes: a configuration section that identifies Enhanced Control Channel Elements (ECCEs) to which control information transmitted over a plurality of subframes is assigned, the ECCEs forming an Enhanced Physical Downlink Control Channel (EPDCCH) set configured in the plurality of subframes; and a reception section that receives the control information assigned to any of the ECCEs on a Physical Resource Block (PRB) pair in each of the plurality of subframes.

A transmission method according to an aspect of the claimed invention includes: configuring an Enhanced Physical Downlink Control Channel (EPDCCH) set in a plurality of subframes, the EPDCCH set being formed of Enhanced Control Channel Elements (ECCEs) to which control information transmitted over the plurality of subframes is assigned; and transmitting the control information assigned to any of the ECCEs on a Physical Resource Block (PRB) pair in each of the plurality of subframes.

A reception method according to an aspect of the claimed invention includes: identifying Enhanced Control Channel Elements (ECCEs) to which control information transmitted over a plurality of subframes is assigned, the ECCEs forming an Enhanced Physical Downlink Control Channel (EPDCCH) set configured in the plurality of subframes; and receiving the control information assigned to any of the ECCEs on a Physical Resource Block (PRB) pair in each of the plurality of subframes.

Advantageous Effects of Invention

According to the claimed invention, it is possible to appropriately configure resources on which EPDCCH is located when soft combining is applied.

BRIEF DESCRIPTION OF DRAWINGS

FIGS. 9A and 9B are diagrams illustrating switching between soft combing and non soft combining according to Embodiment 1 of the claimed invention;
FIGS. 12A and 12B are diagrams each illustrating a configuration example of EPDCCH search spaces according to Embodiment 2 of the claimed invention;
FIG. 13 is a diagram illustrating the number of EPDCCH candidates according to Embodiment 2 of the claimed invention;
FIG. 15 is a diagram illustrating PRB pairs (EREGs) on which ECCE is located according to Embodiment 3 of the claimed invention.

DESCRIPTION OF EMBODIMENTS

Figure 1:
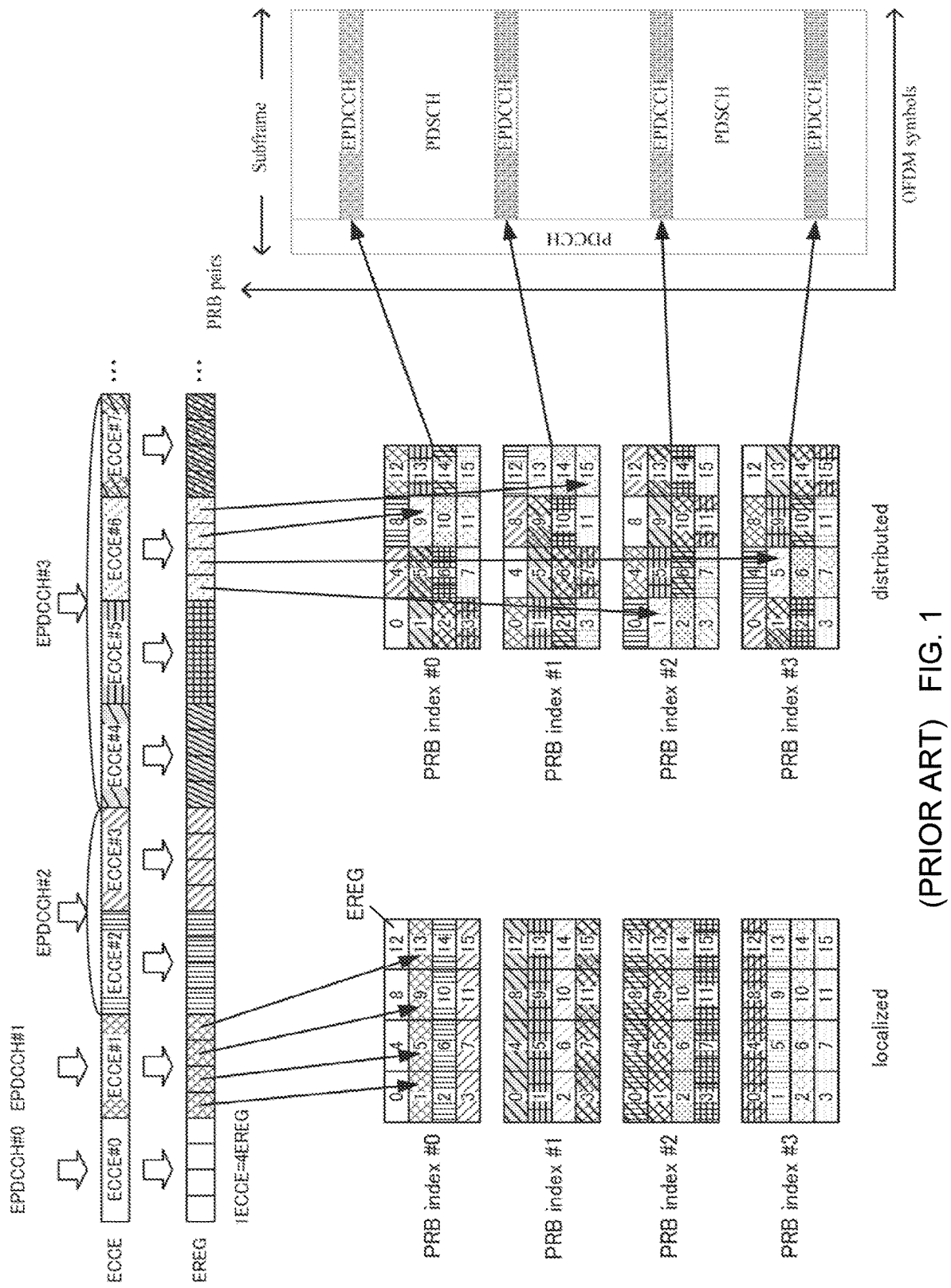
FIG. 1 is a diagram provided for describing EPDCCH.

Hereinafter, embodiments of the claimed invention will be described in detail with reference to the accompanying drawings. Throughout the embodiments, the same elements are assigned the same reference numerals, and any duplicate description of the elements is omitted.

Embodiment 1

(Overview of Communication System)

A communication system according to Embodiment 1 includes base station 100 and terminal 200. This communication system is an LTE-Advanced system, for example. In addition, base station 100 is a base station compliant with the LTE-Advanced system, and terminal 200 is a terminal compliant with the LTE-Advanced system, for example.

Figure 2:
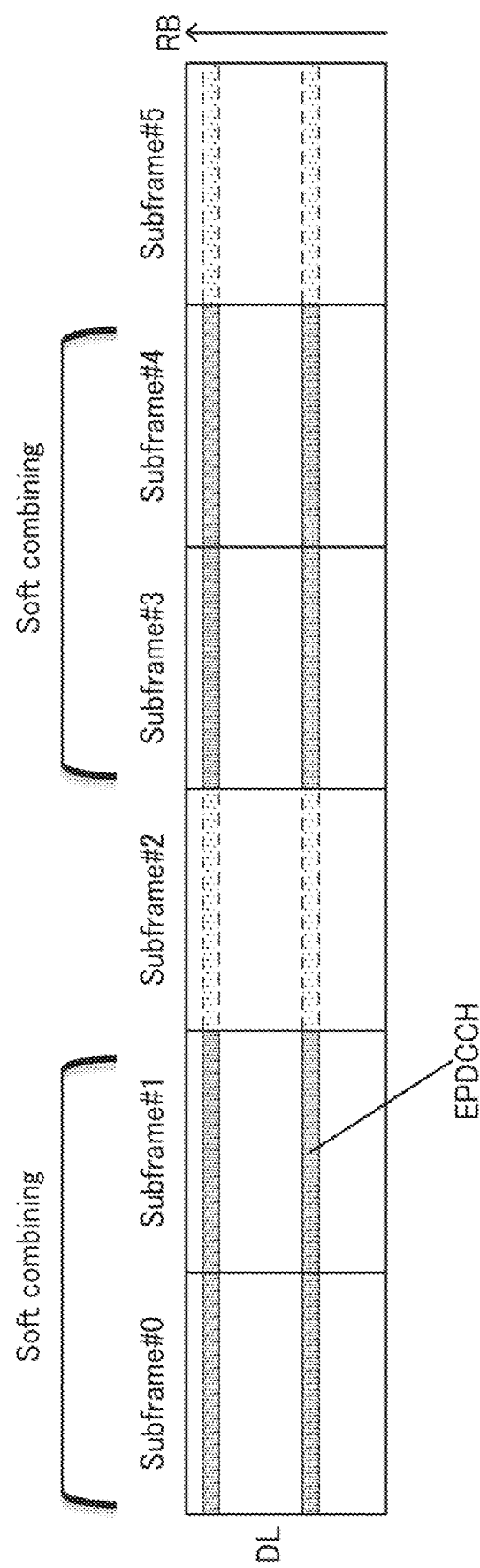
FIG. 2 is a diagram provided for describing soft combining.

In Embodiment 1, when transmitting EPDCCH intended for terminal 200, base station 100 can apply soft combining for transmitting EPDCCH (i.e., control information) over a plurality of subframes (see, FIG. 2). Receiver side (i.e., terminal 200) performs reception processing after combining control information transmitted over a plurality of subframes. The EPDCCH transmitted over a plurality of subframes is formed of a bit sequence that includes an information bit and a redundancy bit and that is generated by performing error correction coding on the information bit. In addition, upon reception of the EPDCCH transmitted over a plurality of subframes, terminal 200 determines the timing of data reception or transmission upon completion of EPDCCH reception and ACK/NACK (i.e., response signals) transmission or reception.

Higher layer signaling previously configures terminal 200 with subframes to which soft combining of EPDCCH is applied. The configuration of the subframes may be different for each terminal. In addition, a single frame may include both of the subframes to which soft combining is applied and to which no soft combining is applied. This configuration allows switching between soft combining of EPDCCH and non soft combining thereof depending on reception quality of each subframe in such a way that soft combing is applied to a subframe subject to a large amount of interference while no soft combining is applied to a subframe subject to a small amount of interference.

It should be noted herein that base station 100 and terminal 200 can transmit and receive control information (i.e., DL assignment or UL grant) using a PDCCH region or EPDCCH region, but the transmission and reception of control information only in an EPDCCH region will be described hereinafter for simplicity of description.

Figure 3:
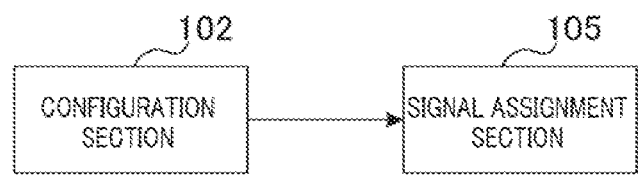
FIG. 3 is a block diagram illustrating a main configuration of a base station according to Embodiment 1 of the claimed invention.

FIG. 3 is a block diagram illustrating a main configuration of base station 100 according to Embodiment 1.

In base station 100, configuration section 102 configures an EPDCCH set formed of ECCEs to which control information (assignment information) transmitted over a plurality of subframes is assigned in the plurality of subframes. Signal assignment section 105 assigns the control information to any of the ECCEs in on a PRB pair in each of the plurality of subframes.

Figure 4:
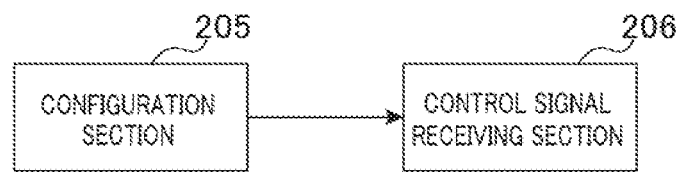
FIG. 4 is a block diagram illustrating a main configuration of a terminal according to Embodiment 1 of the claimed invention.

FIG. 4 is a block diagram illustrating a main configuration of terminal 200 according to Embodiment 1.

In terminal 200, configuration section 205 identifies the ECCE to which control information (assignment information) transmitted over a plurality of subframes is assigned and which forms an EPDCCH set configured in the plurality of subframes. Control signal receiving section 206 receives control information assigned to any of the ECCEs on a PRB pair in each of the plurality of subframes.

Figure 5:
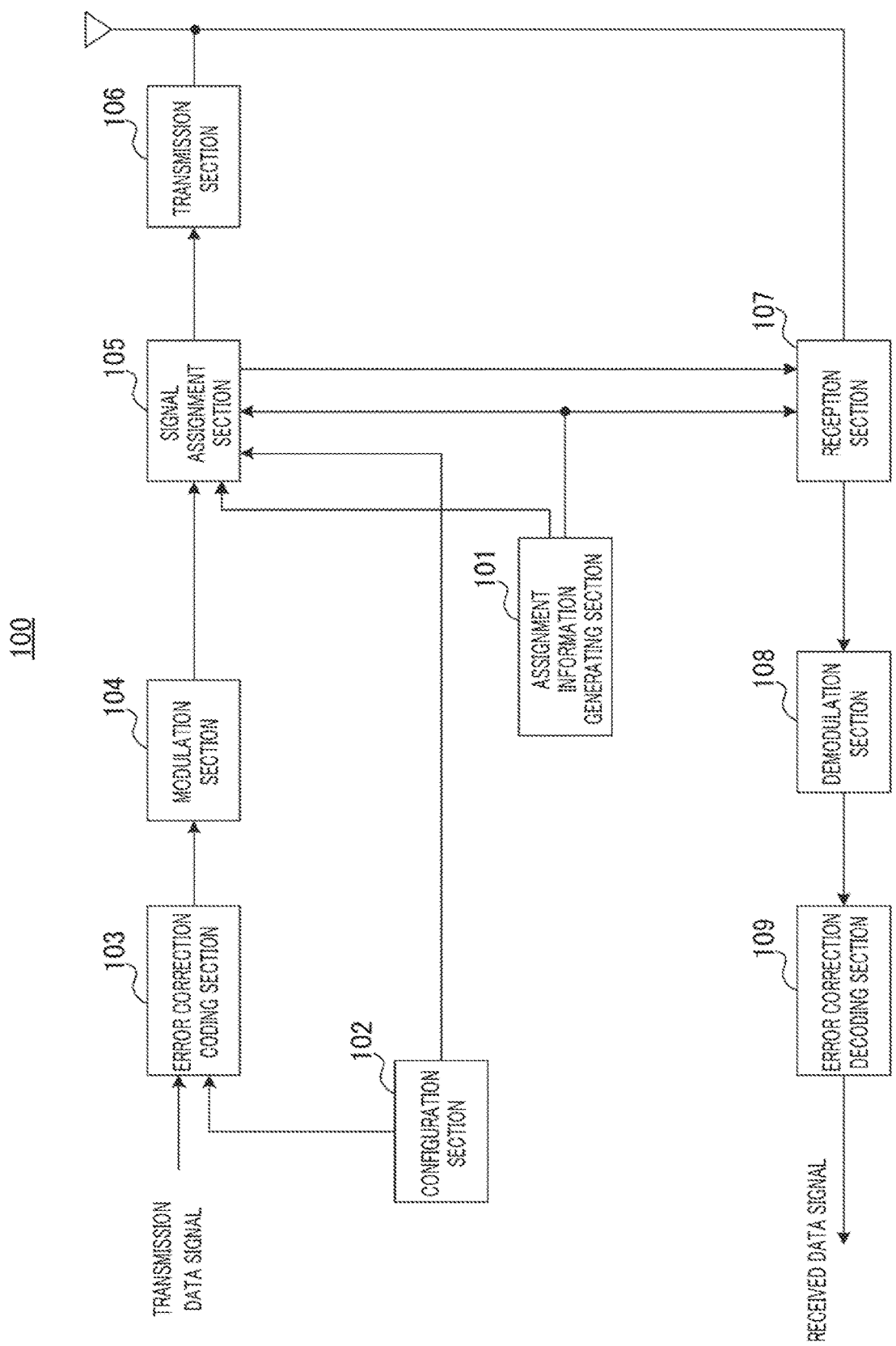
FIG. 5 is a block diagram illustrating a configuration of the base station according to Embodiment 1 of the claimed invention.

(Configuration of Base Station 100) FIG. 5 is a block diagram illustrating a configuration of base station 100 according to Embodiment 1. In FIG. 5, base station 100 includes assignment information generating section 101, configuration section 102, error correction coding section 103, modulation section 104, signal assignment section 105, transmission section 106, reception section 107, demodulation section 108, and error correction decoding section 109.

Assignment information generating section 101 determines a resource (i.e., RB) to which data signals are assigned, when downlink data signals (DL data signals) to be transmitted and uplink data signals (UL data signals) to be assigned to uplink are present, and generates assignment information (DL assignment and UL grant). The DL assignment includes information on the assignment of DL data signals. The UL grant includes information on the assignment resource of UL data signals transmitted from terminal 200. The DL assignment is outputted to signal assignment section 105, and the UL grant is outputted to signal assignment section 105 and reception section 107.

Configuration section 102 configures each terminal 200 with one or more EPDCCH search spaces. More specifically, configuration section 102 configures each terminal 200 with a PRB pair number for locating an EPDCCH search space, an ECCE index for each aggregation level, and the search space (EPDCCH) assignment method (i.e., localized assignment or distributed assignment). An EPDCCH search space is formed of a plurality of assignment candidates (i.e., EPDCCH candidates). Each "assignment candidate" is formed of the same number of ECCEs as the aggregation level.

Configuration section 102 assigns an ECCE index for each search space when configuring terminal 200 with a plurality of EPDCCH search spaces.

Configuration section 102 configures terminal 200 to which soft combining is applied, with the subframes to which soft combining is applied (see, FIG. 2). In addition, configuration section 102 configures terminal 200 to which soft combining is applied, with an EPDCCH set for the plurality of subframes to which soft combing is applied. During this processing, the PRB pair corresponding to the ECCEs forming the EPDCCH set is located in each of the plurality of subframes. Accordingly, in each of the subframes used for soft combining, the search space described above is configured on the basis of the configured EPDCCH set.

Configuration section 102 outputs information on the configured search space and information on the subframe numbers to which soft combining of EPDCCH is applied to signal assignment section 105. The information on the search space includes a PRB pair number, the number of PRB pairs and/or the like, for example. In addition, configuration section 102 outputs information on the PRB pair configured in the search space, and information on the EPDCCH assignment method to error correction coding section 103 as control information.

Error correction coding section 103 takes transmission data signals (i.e., DL data signals), and the control information received from configuration section 102 as input and performs error correction coding on the input signals and outputs the resultant signals to modulation section 104.

Modulation section 104 performs modulation processing on the signals received from error correction coding section 103 and outputs the modulated data signals to signal assignment section 105.

Signal assignment section 105 assigns the assignment information (DL assignment and UL grant) received from assignment information generating section 101 to any of the ECCEs (ECCE in units of assignment candidates) corresponding to the PRB pair number indicated by the search space information received from configuration section 102. During this assignment, when soft combining is configured for the assignment information, signal assignment section 105 assigns the assignment information to any of the ECCEs on a PRB pair in each of a plurality of subframes corresponding to the subframe numbers indicated by the information on soft combining received from configuration section 102. Accordingly, the assignment information is assigned to the PRB pair on which ECCE is located (e.g., see FIG. 1). In addition, signal assignment section 105 assigns the data signals received from modulation section 104 to a downlink resource corresponding to the assignment information (DL assignment) received from assignment information generating section 101.

Transmission signals are thus formed by assignment of the assignment information and data signals to a predetermined resource. The transmission signals thus formed are outputted to transmission section 106. In addition, signal assignment section 105 notifies receiving section 107 of the ECCE index of ECCE used for transmission of DL assignment. It should be noted herein that, when soft combining is applied, signal assignment section 105 notifies receiving section 107 of the ECCE index of ECCE in the end subframe (may be referred to as "last subframe," hereinafter) among the plurality of subframes used for the transmission of DL assignment.

Transmission section 106 performs radio transmission processing such as up-conversion on the received signals and transmits the resultant signals to terminal 200 via an antenna.

Reception section 107 receives, via an antenna, the signals transmitted from terminal 200 and outputs the received signals to demodulation section 108. More specifically, reception section 107 demultiplexes the received signals into signals corresponding to the resource indicated by the UL grant received from assignment information generating section 101, then performs reception processing such as down-conversion on the signals obtained by demultiplexing and outputs the processed signals to demodulation section 108. Reception section 107 extracts (i.e., receives) A/N signals from signals corresponding to a PUCCH resource associated with the ECCE index received from signal assignment section 105.

Demodulation section 108 performs demodulation processing on the received signals and outputs the resultant signals to error correction decoding section 109.

Error correction decoding section 109 decodes the received signals to obtain the received data signals from terminal 200.

(Configuration of Terminal 200)

Figure 6:
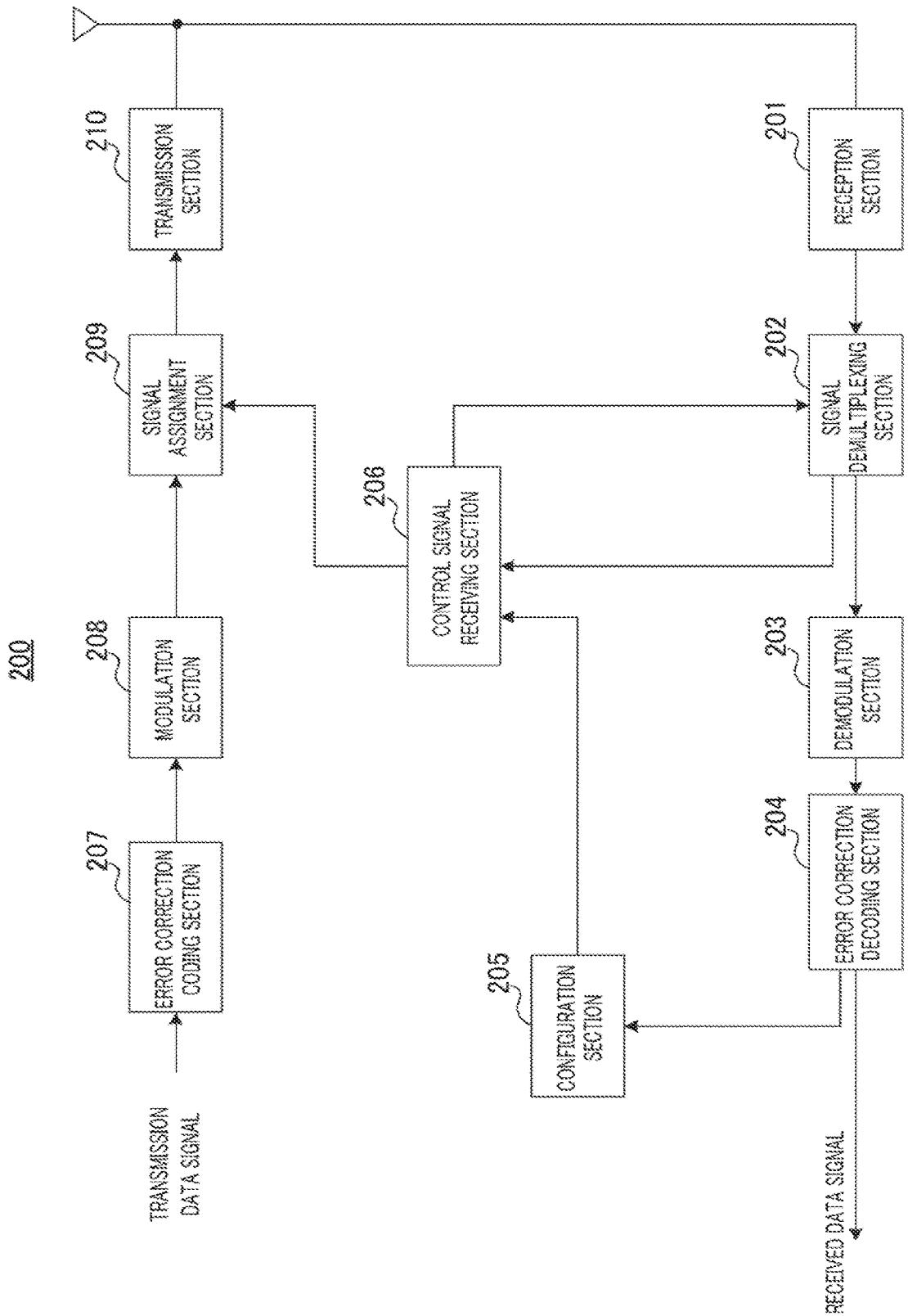
FIG. 6 is a block diagram illustrating a configuration of the terminal according to Embodiment 1 of the claimed invention.

FIG. 6 is a block diagram illustrating a configuration of terminal 200 according to Embodiment 1. In FIG. 6, terminal 200 includes reception section 201, signal demultiplexing section 202, demodulation section 203, error correction decoding section 204, configuration section 205, control signal receiving section 206, error correction coding section 207, modulation section 208, signal assignment section 209, and transmission section 210.

Reception section 201 receives, via an antenna, signals transmitted from base station 100, then performs reception processing such as down-conversion on the received signals and outputs the processed signals to signal demultiplexing section 202.

Signal demultiplexing section 202 extracts control signals for resource assignment from the received signals to be received from reception section 201 and outputs the extracted signals to control signal receiving section 206. In addition, signal demultiplexing section 202 extracts, from the received signals, signals corresponding to the data resource indicated by the DL assignment outputted from control signal receiving section 206 (i.e., DL data signals) and outputs the extracted signals to demodulation section 203. When soft combining of EPDCCH is applied, signal demultiplexing section 202 extracts signals corresponding to the data resource (DL data signals) from the received signals on the basis of the last subframe among the plurality of subframes used for soft combining.

Demodulation section 203 demodulates the signals outputted from signal demultiplexing section 202 and outputs the demodulated signals to error correction decoding section 204.

Error correction decoding section 204 decodes the demodulated signals outputted from demodulation section 203 and outputs the resultant received data signals. In particular, error correction decoding section 204 outputs the "information on the PRB pair configured in the search space" and "information on the subframes to which soft combining of EPDCCH is applied" to configuration section 205.

Configuration section 205 identifies the search space configured for the terminal using the EPDCCH (i.e., terminal 200). Configuration section 205 first identifies the PRB pair to be configured in the search space, on the basis of the information received from error correction decoding section 204, for example. Configuration section 205 then identifies the EPDCCH to which soft combining is applied, on the basis of the information on the subframes to which soft combining of EPDCCH is applied. Configuration section 205 then determines the ECCE index of the search space corresponding to the PRB pair. Accordingly, configuration section 205 identifies the ECCE to which the EPDCCH to be transmitted over a plurality of subframes is assigned (i.e., ECCE forming the EPDCCH set configured in the plurality of subframes). In this processing, when a plurality of EPDCCH search spaces are configured, configuration section 205 allocates an ECCE index to each search space. Moreover, configuration section 205 identifies which ECCE index is configured as an EPDCCH candidate for each aggregation level according to rules that are previously determined for each terminal 200 and is common to base station 100 and terminal 200. For example, configuration section 205 identifies the ECCE index serving as an EPDCCH candidate for each aggregation level on the basis of the UE ID (i.e., terminal specific ID) and whether or not soft combining is applied. Configuration section 205 then outputs the information on the PRB pair and ECCE configured as the search space to control signal receiving section 206.

Control signal receiving section 206 performs blind-decoding on the ECCE corresponding to the PRB pair indicated by the information received from configuration section 205, thereby detecting the control signals (DL assignment or UL grant) intended for terminal 200. More specifically, control signal receiving section 206 receives the control signals assigned to one of a plurality of assignment candidates forming the search space configured by configuration section 205. When soft combining of EPDCCH is applied, control signal receiving section 206 receives the control signals assigned to any of ECCHs on a PRB pair in a plurality of subframes. Control signal receiving section 206 outputs the detected DL assignment intended for terminal 200 to signal demultiplexing section 202 and outputs the detected UL grant intended for terminal 200 to signal assignment section 209. Control signal receiving section 206 outputs the ECCE index of the ECCE on which the DL assignment is detected to signal assignment section 209.

Error correction coding section 207 takes the transmission data signals (UL data signals) as input and performs error correction coding on the transmission data signals and outputs the resultant signals to modulation section 208.

Modulation section 208 modulates the signals received from error correction coding section 207 and outputs the modulated signals to signal assignment section 209.

Signal assignment section 209 assigns the signals received from modulation section 208, according to the UL grant received from control signal receiving section 206 and outputs the resultant signals to transmission section 210. When soft combining of EPDCCH is applied, signal assignment section 209 determines the transmission subframe for the signals on the basis of the last subframe among the plurality of subframes to which soft combining is applied. In addition, signal assignment section 209 assigns the A/N signals received from error correction decoding section 204 to a predetermined resource. More specifically, when transmission data signals are present, signal assignment section 209 multiplexes the A/N signals with the transmission data signals and outputs the resultant signals to transmission section 210. Meanwhile, when no transmission data signals are present, signal assignment section 209 identifies the PUCCH resource on the basis of the ECCE index received from control signal receiving section 206, then assigns the A/N signals to the identified PUCCH resource and outputs the resultant signals to transmission section 210. During this processing, when soft combining of EPDCCH is applied, signal assignment section 209 determines the transmission subframe for the A/N signals on the basis of the last subframe among the plurality of subframes to which soft combining is applied.

Transmission section 210 performs transmission processing such as up-conversion on the received signals and transmits the processed signals.

(Operations of Base Station 100 and Terminal 200)

A description will be provided regarding operations of base station 100 and terminal 200 configured in the manner described above.

Hereinafter, a description will be provided for (1) PDSCH timing, (2) uplink A/N signal (UL ACK/NACK) timing, and (3) PUSCH timing when soft combining of EPDCCH is applied.

(PDSCH Timing)

Base station 100 and terminal 200 configure the transmission timing of PDSCH specified by the DL assignment notified using the EPDCCH to which soft combining is applied (i.e., subframe on which the PDSCH is located) to be the last subframe among the plurality of subframes on which EPDCCH to be soft-combined is located.

Figure 7:
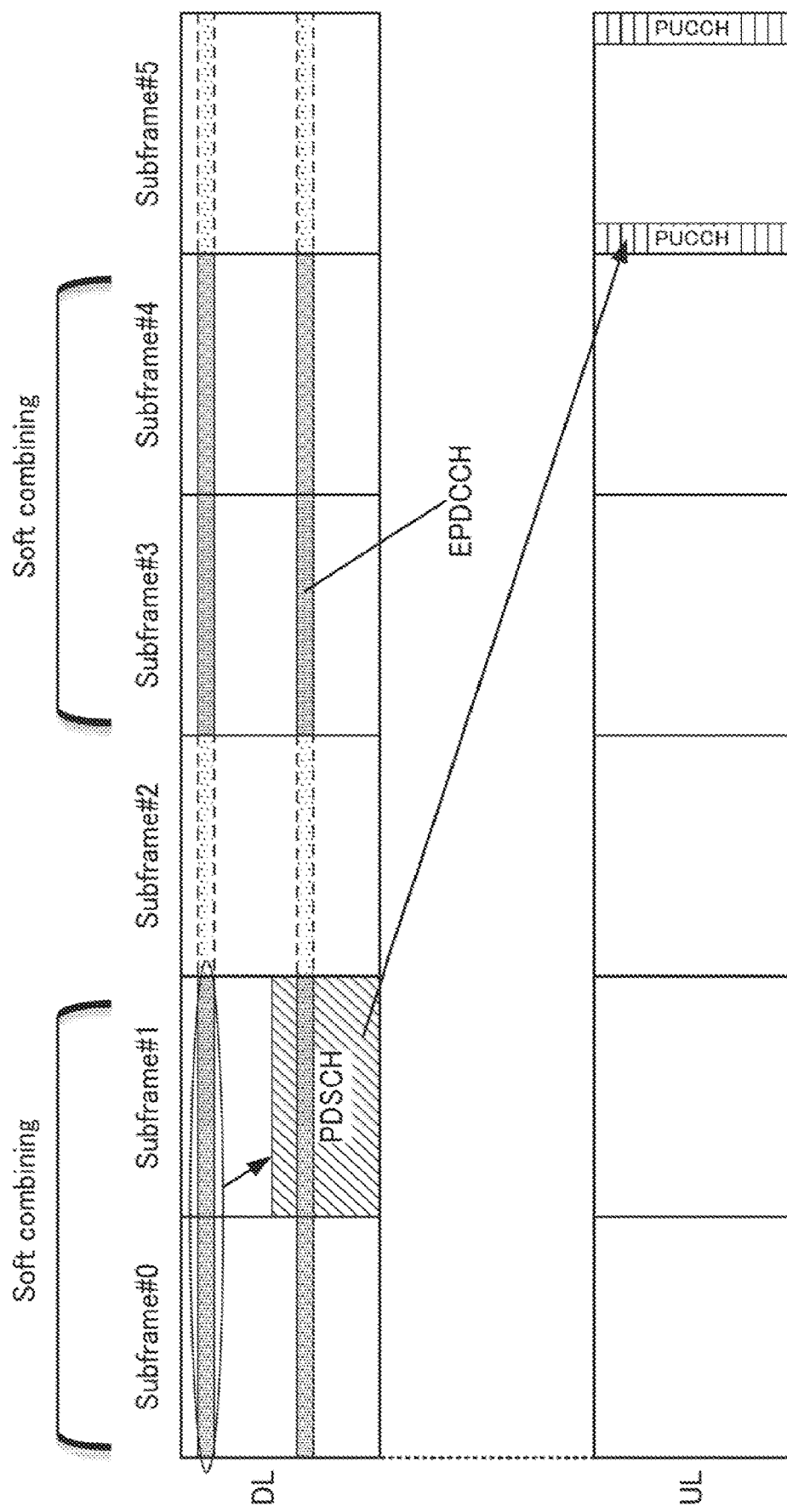
FIG. 7 is a diagram illustrating PDSCH and PUCCH timing according to Embodiment 1 of the claimed invention.

FIG. 7 illustrates a configuration example of PDSCH timing. As illustrated in FIG. 7, when soft combining using two subframes, namely, subframes #0 and #1 is applied, base station 100 locates PDSCH for terminal 200 on subframe #1, which is the last subframe among the two subframes. More specifically, as illustrated in FIG. 7, a resource in subframe #1 is specified as a PDSCH resource in the DL assignment notified using the EPDCCH located in subframes #0 and #1.

In other words, base station 100 (i.e., signal assignment section 105) assigns the downlink data (PDSCH) the assignment of which is indicated by EPDCCH (DL assignment) to the last subframe among the plurality of subframes used for soft combining.

Meanwhile, in FIG. 7, terminal 200 (i.e., control signal receiving section 206) performs blind-decoding on the ECCEs located in subframes #0 and #1 to which soft combining is applied, thereby detecting the DL assignment intended for terminal 200. Terminal 200 (i.e., signal demultiplexing section 202) extracts PDSCH (DL data signals) in subframe #1 on the basis of the detected DL assignment.

During this processing, detection of DL assignment to be notified using EPDCCH to which soft combining is applied is performed after reception of the last subframe in terminal 200. Upon detection of the DL assignment, terminal 200 identifies that PDSCH is assigned to the PRB pair specified by the DL assignment and starts reception processing on the PDSCH.

For this reason, if PDSCH is located in a subframe ahead of the last subframe, terminal 200 needs to store, in a buffer, received signals on all the PRB pairs that may have been assigned to PDSCH until completion of identifying (detecting) the PRB pair assigned to PDSCH.

On the other hand, PDSCH is located in the last subframe among the plurality of subframes to which soft combining is applied in Embodiment 1. Accordingly, the period for saving, in a buffer, the received signals that are received from the reception timing of PDSCH to the completion of EPDCCH detection can be minimized. To put it differently, the period for saving, in a buffer, the received signals that are received from the reception timing of PDSCH to the completion of EPDCCH detection when soft combining of EPDCCH is applied can be the same as the period used when no soft combining of EPDCCH is applied (non soft combining). Thus, it is possible to prevent an increase in the size of the buffer to be included in terminal 200.

(UL ACK/NACK Timing) In LTE-Advanced, after reception of PDSCH, terminals perform reception determination (i.e., error determination) and transmit uplink A/N signals (UL ACK/NACK) to base station 100 (not illustrated). In addition, the subframe used for transmitting uplink A/N signals is previously defined. More specifically, the fourth subframe following the subframe to which PDSCH is assigned is configured as the subframe used for transmitting uplink A/N signals in a frequency division duplex (FDD) system. In a time division duplex (TDD) system, the subframe used for transmitting uplink A/N signals is defined for each TDD UL-DL configuration (i.e., timing configuration in units of subframes for downlink communication (DL) and uplink communication (UL) per frame). In both of the FDD system and TDD system, the transmission timing of uplink A/N signals is always configured to be the fourth or after the fourth subframe following the transmission of PDSCH.

In Embodiment 1, the transmission timing of uplink A/N signals (i.e., subframe used for transmission of UL ACK/NACK) is defined according to the reception subframe for PDSCH (i.e., subframe in which PDSCH is transmitted). The transmission timing of uplink A/N signals is configured to be the fourth subframe following the reception subframe for PDSCH in the FDD system, while the transmission timing of uplink A/N signals is defined according to each TDD UL-DL configuration in the TDD system, using the subframe on which PDSCH is received, as the basis. Uplink A/N signals are transmitted in a PUSCH region when there is PUSCH transmission or transmitted in a PUCCH region when there is no PUSCH transmission.

In LTE-Advanced, when uplink A/N signals are transmitted in a PUCCH region, a PUCCH resource associated with the smallest ECCE number among the ECCEs forming EPDCCH on which DL assignment is located (i.e., EPDCCH subframe on which PDSCH is transmitted) (i.e., implicitly indicated resource) is specified so that the PUCCH resource is automatically (implicitly) assigned to avoid a PUCCH resource collision between terminals.

Thus, base station 100 and terminal 200 identify the PUCCH resource associated with the ECCE number of EPDCCH located in the subframe on which PDSCH is transmitted, when soft combining of EPDCCH is applied.

In other words, terminal 200 transmits A/N signals (response signals) for the downlink data on PUCCH associated with the ECCE located in a subframe to which the downlink data (PDSCH) is assigned among the plurality of subframes used for soft combining, the assignment of the downlink data (PDSCH) being indicated by EPDCCH (DL assignment). Accordingly, when the ECCE number to be assigned varies depending on the subframe, the ECCE associated with the PUCCH resource used for transmission of A/N signals is not necessarily the smallest ECCE number among the ECCEs forming EPDCCH. Likewise, base station 100 (i.e., reception section 107) receives A/N signals (response signals) for the downlink data on PUCCH associated with the ECCE located in a subframe to which the downlink data (PDSCH) is assigned among the plurality of subframes used for soft combining, the assignment of the downlink data (PDSCH) being indicated by EPDCCH (DL assignment).

For example, when PDSCH is located in the last subframe among the plurality of subframes to which soft combining of EPDCCH is applied, base station 100 and terminal 200 use the ECCE number of the EPDCCH located in the last subframe and thereby identify the PUCCH resource to which the uplink A/N signals for the PDSCH are assigned. More specifically, PDSCH is located in subframe #1, which is the last subframe among subframes #0 and #1 to which soft combining of EPDCCH is applied in FIG. 7. Accordingly, base station 100 and terminal 200 identify the PUCCH resource associated with the ECCE number of the EPDCCH located in subframe #1, in subframe #5, which corresponds to the fourth subframe following subframe #1, as the PUCCH resource to which the uplink A/N signals for the PDSCH are assigned in FIG. 7.

Accordingly, even when an EPDCCH search space is shared between a terminal to which soft combining of EPDCCH is applied and a terminal to which no soft combining of EPDCCH is applied, base station 100 assigns the ECCE numbers used in the EPDCCH intended for these terminals in the subframe to which the PDSCH intended for both of the terminals is assigned. Thus, in this subframe, the ECCE numbers are assigned considering a PUCCH resource collision between the terminals, so that PUCCH resources are automatically (implicitly) assigned in a way that avoids a PUCCH resource collision between the terminals.

(PUSCH Timing)

In LTE-Advanced, terminals transmit PUSCH after receiving UL grant. The subframe used for transmission of PUSCH is previously determined. More specifically, the fourth subframe following the subframe to which UL grant is assigned is configured as the subframe on which PUSCH is transmitted in the FDD system, while the subframe on which PUSCH is transmitted is defined according to each TDD UL-DL configuration in the TDD system. In addition, when the number of UL subframes is greater than the number of DL subframes in a single frame, PUSCH on a plurality of UL subframes may be specified in a single DL subframe. However, in this case as well, the subframe on which PUSCH is transmitted is always configured to be the fourth subframe following the subframe to which UL grant is assigned or a subframe after the fourth subframe.

Moreover, after detection of UL grant, terminals identify that the PRB pair specified by the UL grant is assigned to PUSCH and determine the size and transmission method of data (PUSCH). Accordingly, unless at least a certain interval after the last subframe (i.e., detection of UL grant) among the subframes to which soft combining is applied is provided (four subframes or more in LTE-Advanced), PUSCH transmission processing cannot be prepared in terminals.

In this respect, the transmission timing of PUSCH specified by the UL grant transmitted using EPDCCH to which soft combining is applied is identified using, as the basis, the last subframe among the plurality of subframes on which the EPDCCH to be soft-combined is located in Embodiment 1. Since the transmission timing of PUSCH (i.e., subframe on which PUSCH is transmitted and received) is identified using the last subframe used for soft combining, the interval from the detection timing of UL grant until preparation for PUSCH transmission can be the same as the interval used when no soft combining of EPDCCH is applied.

In particular, in the TDD system, there is a subframe on which no UL grant is transmitted among DL subframes in accordance with an association between transmission and reception timing of UL grant and transmission and reception timing of PUSCH (i.e., UL grant-PUSCH timing) defined for each UL-DL configuration. In this respect, in the TDD system, the last subframe among the plurality of subframes used for soft combining is made the same as the transmission subframe for EPDCCH including UL grant (i.e., subframe in which EPDCCH including UL grant is transmitted).

Figure 8:
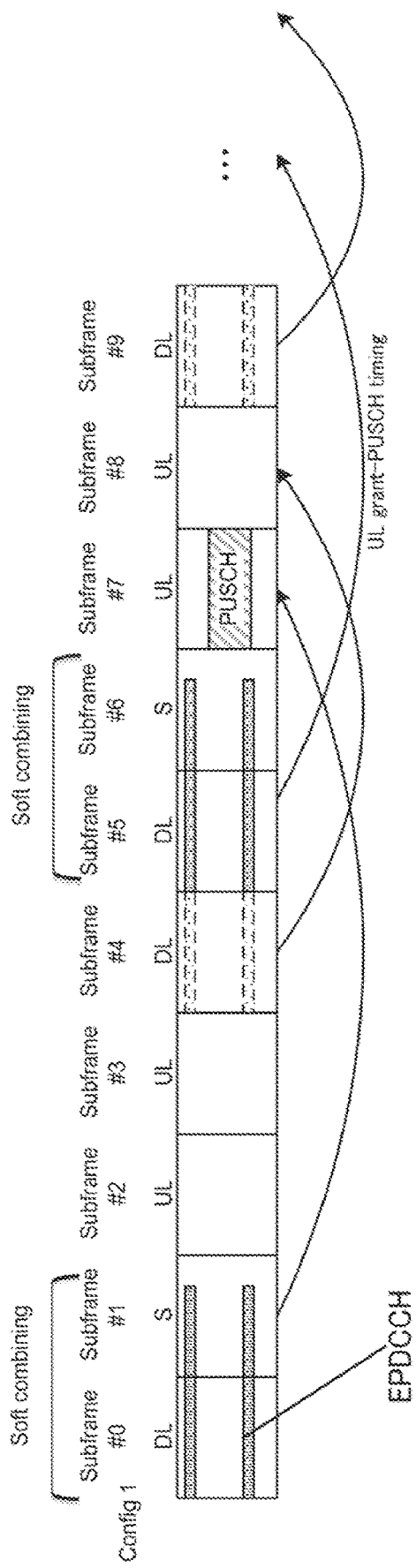
FIG. 8 is a diagram illustrating PUSCH timing according to Embodiment 1 of the claimed invention.

FIG. 8 illustrates subframes in case of UL-DL configuration #1, for example. As illustrated in FIG. 8, subframes #0, #4, #5, and #9 are DL subframes, while subframes #1 and #6 are special subframes (i.e., subframes that can be used for EPDCCH and PDSCH transmission), and subframes #2, #3, #7, and #8 are UL subframes UL-DL configuration #1. Moreover, UL grant-PUSCH timing is previously defined as illustrated in FIG. 8, and the subframes on which UL grant can be located are subframes #1, #4, #6, and #9, and for the UL grant notified in each of the subframes, PDSCH is assigned to UL subframes #7, #8, subframe #2 of the next frame (not illustrated), and subframe #3 of the next frame.

Meanwhile, as illustrated in FIG. 8, when soft combining is applied, there is a case where UL grant is located in a subframe on which no UL grant is transmitted. In this respect, in Embodiment 1, when soft combining of EPDCCH including UL grant is applied, the last subframe among the subframes on which EPDCCH to be soft-combined is located is configured as a subframe capable of transmitting UL grant when no soft combining is applied.

In this configuration, soft combining can be utilized without changing PUSCH timing from the UL grant detection timing.

For example, only subframes #1, #4, #6, and #9 are configured as the last subframe used for soft combining in FIG. 8. More specifically, soft combining of EPDCCH including UL grant is configured in each of subframes #0 and #1 and subframes #5 and #6 in FIG. 8. As illustrated in FIG. 8, EPDCCH including UL grant is located in subframes #0 and #5 on which no UL grant is located when no soft combining is applied. In this case as well, the transmission timing of PUSCH indicated by the UL grant notified using the EPDCCH is identified on the basis of the last subframe among the subframes in which the EPDCCH is transmitted. In sum, when soft combining including UL grant is applied, the PUSCH timing specified by the UL grant transmitted using EPDCCH to which soft combining is applied (i.e., first transmission subframe for PUSCH) is defined using, as the basis, the last subframe on which EPDCCH to be soft combined is located. Accordingly, soft combining can be utilized without any change in the relationship between the detection timing of UL grant and the PUSCH timing compared to a case where no soft combining is applied.

It should be noted that, when the subframe specified as a subframe to which soft combining of EPDCCH is applied is common to DL assignment and UL grant, regarding UL grant, it is possible to employ a configuration in which soft combining is performed on condition that the abovementioned last subframe is configured as a subframe capable of transmitting UL grant when no soft combining is applied, and no soft combining is performed when this condition is not satisfied.

Hereinabove, a description has been provided regarding the timing of signals (i.e., PDSCH, UL ACK/NACK, and PUSCH) when soft combining of EPDCCH is applied.

Next, a description will be provided regarding switching between soft combining and non soft combining.

For example, in a subframe to which soft combining of EPDCCH is applied, the EPDCCH candidates in the same subframe may be divided into an EPDCCH candidate for soft combining and an EPDCCH candidate for non soft combining. This configuration make it possible to flexibly switch between soft combining and non soft combining depending on instant channel quality by selecting the EPDCCH candidate to be used in the same sub frame.

In the following example, the number of EPDCCH candidates for soft combining is referred to as "K1" and the number of EPDCCH candidates for non soft combining is referred to as "K2." FIG. 9A illustrates an example of the relationship between the aggregation level (L), the number of PRB pairs, and the number of EPDCCH candidates in LTE-Advanced.

FIG. 9B illustrates an example in which the EPDCCH candidates in FIG. 9A are divided into EPDCCH candidates for soft combining and EPDCCH candidates for non soft combining when switching between soft combining and non soft combining is employed.

Application of one of three methods 1 to 3 may be possible for utilizing EPDCCH for non soft combining, for example.

(Method 1)

In Method 1, EPDCCH for non soft combining can be located in any subframe, but PDSCH notified by the EPDCCH is located in the subframe corresponding to the last subframe among the subframes to which soft combining is applied, and PUSCH notified by the EPDCCH is located in a subframe identified using the last subframe as the basis.

In Method 1, terminal 200 monitors (i.e., blind-decodes) K2 EPDCCH candidates in subframes other than the last subframe and monitors K1+K2 EPDCCH candidates in the last subframe.

According to Method 1, each of the PDSCH timing and PUSCH timing for soft combining can be used when no soft combining is applied, which makes the scheduling simple. In particular, in UL HARQ, since the UL HARQ process number is determined depending on the subframe, it is possible to switch between soft combining and non soft combining without changing the UL HARQ process number.

(Method 2)

In Method 2, EPDCCH for non soft combining is located in a subframe other than the subframe corresponding to the last subframe among the subframes to which soft combining is applied. More specifically, when the number of subframes to which soft combining is applied is two, EPDCCH for non soft combining is located in the first subframe.

In this case, terminal 200 monitors K2 EPDCCH candidates in the subframe other than the last subframe and monitors K1 EPDCCH candidates in the last subframe.

According to Method 2, the number of EPDCCH candidates monitored by terminal 200 in each subframe can be averaged because the subframes that become monitoring targets for EPDCCH candidates are distributed in accordance with whether or not soft combining is applied.

In addition, a subframe on which EPDCCH for non soft combining is transmitted and a subframe on which PDSCH notified by this EPDCCH is transmitted may be configured as different subframes. This configuration can separate an EPDCCH subframe and a data (PDSCH) subframe, thus allowing the power useable for EPDCCH transmission to be allocated to data transmission when the data transmission requires power.

(Method 3)

In method 3, EPDCCH for non soft combining can be located in any subframe.

In method 3, terminal 200 monitors K2 EPDCCH candidates in a subframe other than the subframe corresponding to the last subframe among the subframes to which soft combining is applied and monitors K1+K2 EPDCCH candidates in the subframe corresponding to the last subframe.

In addition, PDSCH may be located in any subframe, and PUSCH is located in a subframe identified using the subframe on which EPDCCH is detected, as the basis.

According to method 3, PDSCH/PUSCH can be assigned more flexibly when no soft combining is applied.

Hereinabove, a description has been given regarding switching between soft combining and non soft combining.

As described above, according to Embodiment 1, the transmission timing of each set of signals (resource allocation for each set of signals) when soft combining is applied can be appropriately configured.

It should be noted that, application of soft combining of PDSCH and PUSCH (sometimes, called "TTI bundling") in combination with soft combining of EPDCCH described above may be possible. In this case, the first subframe of DL data (PDSCH) the assignment of which is indicated using DL assignment may be located in the last subframe among a plurality of subframes on which EPDCCH including the DL assignment is transmitted. In this configuration, the period for saving, in a buffer, the received signals that are received from the reception timing of PDSCH to the completion of EPDCCH detection processing (i.e., signals that may be PDSCH) can be the same as the period used when no soft combining of EPDCCH is applied.

Embodiment 2

In Embodiment 2, a description will be provided regarding resource allocation for EPDCCH (i.e., search space configuration) in a plurality of subframes on which EPDCCH to be soft combined is located.

The base station and terminal according to Embodiment 2 include the same basic configurations as base station 100 and terminal 200 according to Embodiment 1. Accordingly, the description will be provided with reference to FIGS. 5 and 6.

In Embodiment 2, a single EPDCCH set is configured in each of a plurality of subframes used for soft combining. More specifically, a plurality of EPDCCH sets respectively configured in a plurality of subframes are connected to each other for soft combining of EPDCCH.

It should be noted that, the number of PRB pairs and a PRB pair number (frequency resource, i.e., PRB pair position) are configured for each EPDCCH set. In addition, the number of PRB pairs determines $N_{ECCE}$, which is the number of ECCEs in an EPDCCH set, and the ECCEs of ECCE #0 to ECCE #$N_{ECCE}$−1 are located.

Figure 10:
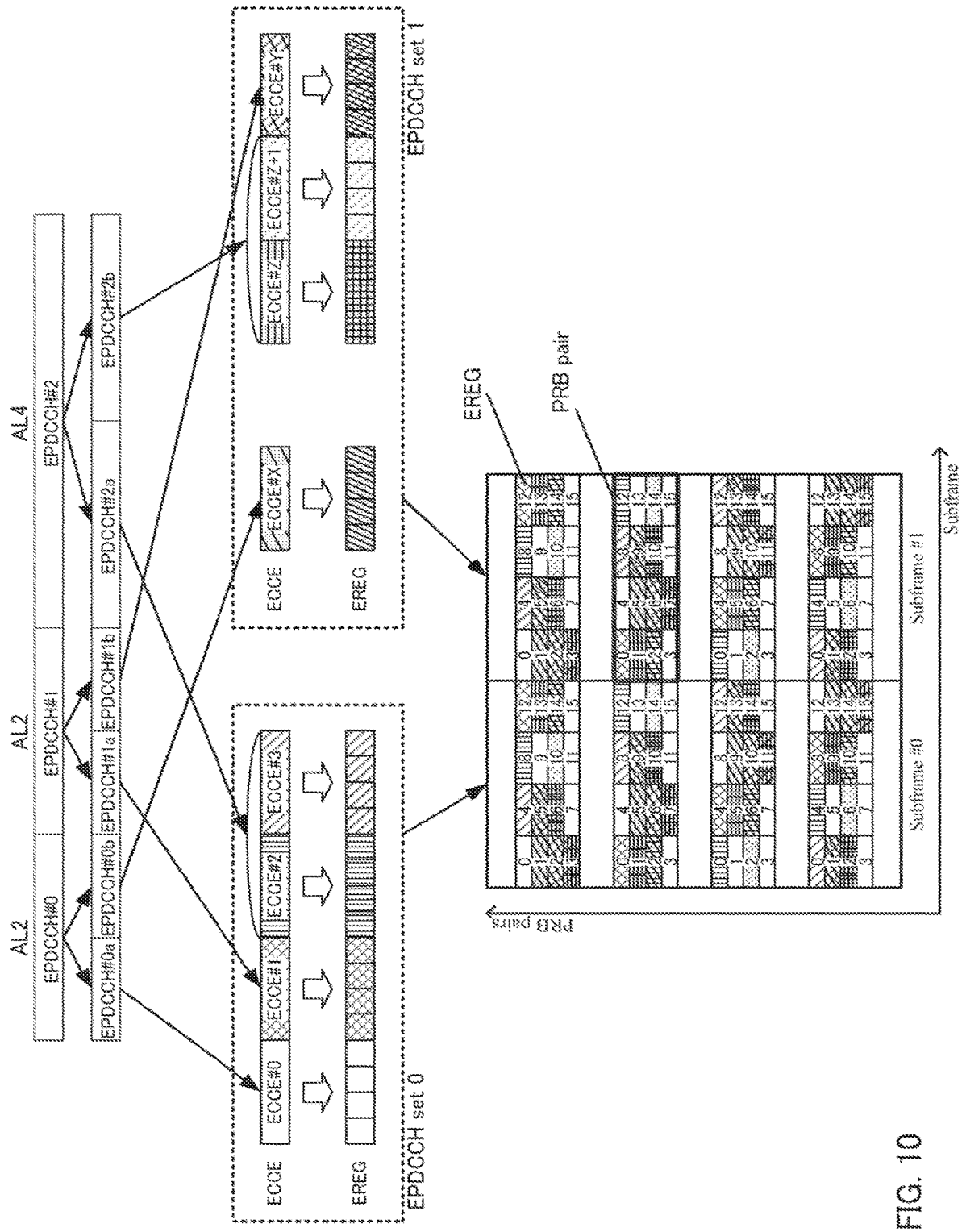
FIG. 10 is a diagram illustrating a configuration example of EPDCCH candidates according to Embodiment 2 of the claimed invention.

FIG. 10 illustrates an example in which soft combining of EPDCCH is performed using two subframes. It should be noted that, the bit sequence of EPDCCH to be transmitted is previously configured as one that is equivalent to at least aggregation level 2 (at least AL2). In FIG. 10, the aggregation levels of EPDCCH #0 and EPDCCH #1 are AL2, and the aggregation level of EPDCCH #2 is AL4.

In Embodiment 2, each EPDCCH is divided into two EPDCCHs, and the two EPDCCHs are respectively located on an ECCE of EPDCCH set 0 (EPDCCH set corresponding to subframe #0) and an ECCE of EPDCCH set 1 (EPDCCH set corresponding to subframe #1). In other words, each EPDCCH is divided in units of ECCEs.

For example, in FIG. 10, EPDCCH #0 is divided into EPDCCH #0a and EPDCCH #0b, and EPDCCH #0a and EPDCCH #0b are respectively located on EPDCCH candidates of AL1 (each candidate corresponding to one ECCE) of EPDCCH set 0 and EPDCCH set 1. Likewise, EPDCCH #1 is divided into EPDCCH #1 a and EPDCCH #1b, and EPDCCH #1 a and EPDCCH #1b are respectively located on EPDCCH candidates of AL1 (each candidate corresponding to one ECCE) of EPDCCH set 0 and EPDCCH set 1. Likewise, EPDCCH #2 is divided into EPDCCH #2a and EPDCCH #2b, and EPDCCH #2a and EPDCCH #2b are respectively located on EPDCCH candidates of AL2 (each candidate corresponding to two ECCEs) of EPDCCH set 0 and EPDCCH set 1.

To put it differently, base station 100 (i.e., configuration section 102) configures an EPDCCH set in each of a plurality of subframes used for soft combining. In addition, base station 100 (i.e., signal assignment section 105) divides EPDCCH (control information) into the same number of EPDCCHs in units of ECCEs as the number of the plurality of subframes and assigns each of the divided EPDCCHs to any of the ECCEs forming the EPDCCH set configured in one of the plurality of subframes.

In this case, the EPDCCH candidate for each terminal 200 varies depending on the subframe number. Accordingly, as illustrated in FIG. 10, the divided EPDCCHs are located on different EPDCCH candidates in subframes #0 and #1, respectively. In LTE-Advanced, studies have been carried on two equations 1 and 2 below as equations for determining EPDCCH candidates for each terminal 200.

[1]
$$L\{(Y_{p,k} + m') \bmod \lfloor N_{ECCE,p,k}/L \rfloor\} + i \quad \text{(Equation 1)}$$

[2]
$$L\left\{\left(Y_{p,k} + \left\lfloor \frac{m' \cdot N_{ECCE,p,k}}{L \cdot M_P^{(L)}} \right\rfloor\right) \bmod \lfloor N_{ECCE,p,k}/L \rfloor\right\} + i \quad \text{(Equation 2)}$$

In equations 1 and 2, L represents aggregation level (AL), $Y_{p,k}$ represents UE ID (i.e., terminal ID), k represents subframe number, and p represents search space set number. In addition, i takes on the value of 0, 1, . . . , L−1.

Moreover, m' represents the parameter used when cross-carrier scheduling is configured and expressed by the next equation.
[3]
$$m' = m + M_P^{(L)} \cdot n_{CI} \quad \text{(Equation 3)}$$

$M_P^{(L)}$ represents the number of EPDCCH candidates to be monitored at aggregation level (L) and $n_{CI}$ represents the parameter used in configuring cross-carrier scheduling (i.e., carrier indicator field value). In equation 3, m'=m when no cross-carrier scheduling is configured.

Moreover, m is expressed by the next equation.
[4]
$$m = 0, 1 \ldots M_P^{(L)} - 1 \quad \text{(Equation 4)}$$

More specifically, m represents the EPDCCH candidate number for each aggregation level (L).

In Embodiment 2, each of the divided EPDCCHs is located on an EPDCCH candidate represented by m (the same number between the subframes) in each of the subframes to which soft combining is applied.

In this manner, EPDCCH candidate numbers to be used can be shared between subframes. More specifically, in the subframes to which soft combining is applied (two subframes in this embodiment), the number of combinations of EPDCCH candidates that is equal to $M_P^{(L)} * M_P^{(L)}$ patterns can be limited to $M_P^{(L)}$ patterns. Even when an EPDCCH candidate of the same number m is used in subframes, the EPDCCH candidate (ECCE) is different for each subframe. More specifically, even with the EPDCCH candidate of the same number m, the frequency resource allocated to each subframe is different, so that frequency diversity effect can be obtained. In addition, when the number of REs to be actually allocated varies for each ECCE number, the number of REs can be averaged.

Next, a description will be provided regarding methods 1 and 2 for configuring an EPDCCH search space in subframes to which soft combining is applied. It should be noted that, a case where soft combining is applied over two subframes will be described as an example. However, the number of subframes used for soft combining is not limited to two and can be three or more.

(Method 1: When EPDCCH Sets Configured in Two Subframes are the Same)

Figures 11A, 11B:
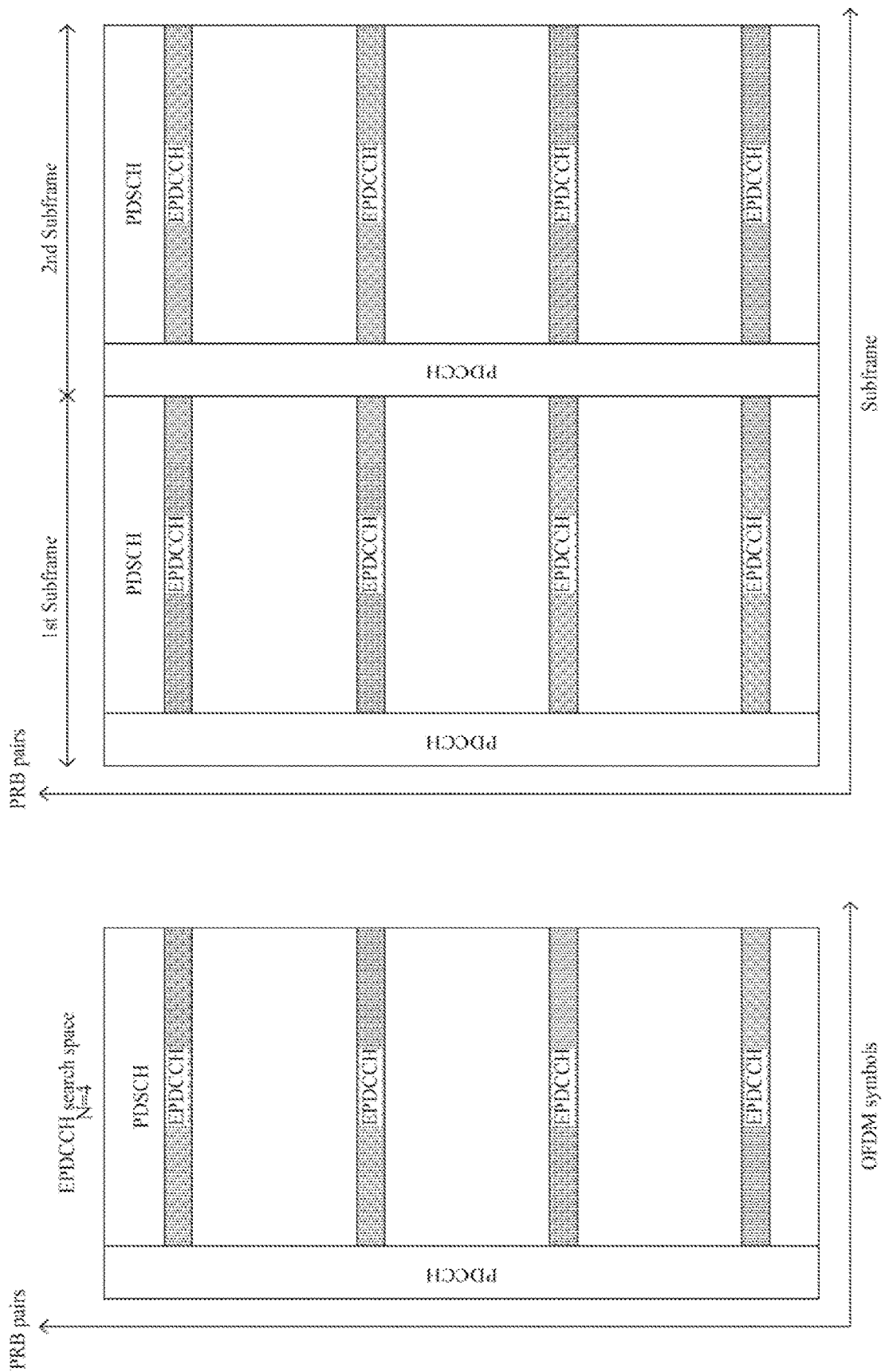
FIGS. 11A and 11B are diagrams each illustrating a configuration example of EPDCCH search spaces according to Embodiment 2 of the claimed invention.

FIG. 11A illustrates an EPDCCH set configured for non soft combining and FIG. 11B illustrates EPDCCH sets configured for soft combining.

As illustrated in FIG. 11B, EPDCCH sets 0 and 1 respectively configured in the two subframes to which soft combining is applied (first and second subframes) are assumed to be the same.

Accordingly, as illustrated in FIG. 11B, the EPDCCH sets respectively located in the subframes include the same number of PRB pairs (four) and the same PRB numbers (the same PRB pair arrangement positions). However, EREGs corresponding to EPDCCH candidates forming each EPDCCH set are different in each of the subframes.

In this manner, EPDCCH candidates at each aggregation level (AL) are equal to each other between EPDCCH sets (i.e., between subframes to which the same EPDCCH is assigned). Accordingly, all the EPDCCH candidates can be used as search spaces for soft combining of EPDCCH.

In addition, since EPDCCH is located on the same PRB pairs in a plurality of subframes, precoding for demodulation reference signals (DMRS), which are the reference signals used for EPDCCH, can be shared between the subframes. Accordingly, when the moving speed of terminal 200 is slow, for example, an assumption can be made that channel fluctuation is small between contiguous subframes, so that terminal 200 can combine the reference signals of a plurality of subframes to improve the channel estimation accuracy.

In addition, LTE-Advanced allows each terminal to be configured with two EPDCCH sets. Thus, it is possible to dynamically switch between soft combining and non soft combining by configuring one EPDCCH set for soft combining and the other EPDCCH for non soft combining.

(Method 2: When EPDCCH Sets Configured in Two Subframes are Different)

FIG. 12A illustrates EPDCCH sets for non soft combining, and FIG. 12B illustrates EPDCCH sets configured for soft combining.

As illustrated in FIG. 12B, EPDCCH sets 0 and 1 respectively configured in the two subframes to which soft combining is applied (first and second subframes) are different.

In the subframes to which soft combining is applied, a single EPDCCH set is located in each of the subframes as illustrated in FIG. 12B, while two EPDCCH sets are located in the subframe to which no soft combining is applied as illustrated in FIG. 12A.

As illustrated in FIGS. 12A and 12B, the number of PRB pairs, the PRB numbers (PRB pair arrangement positions), and the assignment method (distributed assignment or localized assignment) can be configured in each of the EPDCCH sets respectively configured in the plurality of subframes used for soft combining. More specifically, soft combining can be performed using EPDCCH sets that are different in design in Method 2.

For example, in FIG. 12B, among the two subframes to which soft combining of EPDCCH is applied, the number of PRB pairs of the EPDCCH set configured in the first subframe is four (N=4) and the number of PRB pairs of the EPDCCH set configured in the second subframe is two (N=2). As described, since the number of PRB pairs is different between the subframes (between the EPDCCH sets), the number of EPDCCH candidates for each aggregation level is also different. For example, as illustrated in FIG. 13, the numbers of EPDCCH candidates when the number of PRB pairs N=2 are 4, 2, 1, 1, and 0 for the ALs (L=1, 2, 4, 8, and 16), respectively, while the numbers of EPDCCH candidates when the number of PRB pairs N=4 are 2, 3, 2, 1, and 1 for the ALs (L=1, 2, 4, 8, and 16), respectively.

In FIG. 13, with reference to AL1 (L=1, but L=2 when soft combining is applied), the number of EPDCCH candidates when the number of PRB pairs=2 is four (i.e., EPDCCH candidate numbers m=0, 1, 2, and 3), and the number of EPDCCH candidates when the number of PRB pairs=4 is two (i.e., EPDCCH candidate numbers m=0 and 1). In this case, base station 100 and terminal 200 use only two EPDCCH candidates (m=0 and 1) common to the two EPDCCH sets as the EPDCCH candidates for soft combining and use the remaining EPDCCH candidates (i.e., two EPDCCH candidates m=2 and 3 when the number of PRB pairs N=2) as the EPDCCH candidates for non soft combining. The same applies to the other ALs.

To put it differently, since the EPDCCH candidates for each AL are different between EPDCCH sets, the EPDCCH candidates of the EPDCCH set smaller in number are used as the search spaces for soft combining in Method 2. In this case, the remaining EPDCCH candidates of the EPDCCH set larger in number can be used as the search spaces for non soft combining.

In addition, according to Method 2, the region used for EPDCCH can be changed for each subframe. For example, when PDSCH is located in the last subframe (e.g., second subframe in FIG. 12B) among the subframes used for soft combining, the EPDCCH region located in the last subframe is reduced in size compared with the other subframe (e.g., first subframe in FIG. 12B), which makes it possible to ensure the PDSCH region.

Methods 1 and 2 for configuring search spaces have been described above.

As described above, according to Embodiment 2, the resource allocation for locating EPDCCH when soft combining is applied can be appropriately configured.

It should be noted that, the number of EPDCCH candidates for each AL varies depending on conditions such as a DCI format, bandwidth, subframe type and/or the number of subcarriers in EPDCCH of LTE-Advanced. More specifically, the abovementioned conditions are classified into Cases 1, 2, and 3 in LTE-Advanced. Case 1 supports AL2 (L=2) or above, while Cases 2 and 3 support AL1 (L=1) or above. For this reason, although Embodiment 2 has been described with the case assuming EPDCCH at AL2 or above, EPDCCH at AL1 can be treated as EPDCCH at AL2 or above by application of soft combining. More specifically, in Embodiment 2, it is possible to apply, to all DCI formats, not only Case 1 in which the number of EPDCCH candidates at AL2 or above is prepared, but also Cases 2 or 3 in which the number of EPDCCH candidates at AL1 or above is prepared. In this manner, the AL can be prevented from rising too high in case of soft combining.

Embodiment 3

In Embodiment 2, a description has been given regarding the case where soft combining is performed while a plurality of EPDCCH sets respectively configured in a plurality of subframes to which soft combining is applied are connected to each other. On the other hand, in Embodiment 3, a description will be provided regarding a case where PRB pairs of a single EPDCCH set are distributed into a plurality of subframes to which soft combining is applied.

The base station and terminal according to Embodiment 3 include the same basic configuration as base station 100 and terminal 200 according to Embodiment 1. Accordingly, the description will be provided with reference to FIGS. 5 and 6.

More specifically, base station 100 (i.e., configuration section 102) configures a single EPDCCH set entirely for the plurality of subframes used for soft combining. However, the PRB pairs corresponding to the ECCEs forming the single EPDCCH set are distributedly located in the plurality of subframes used for soft combining.

For example, when the number of PRB pairs of the EPDCCH set is N while the number of subframes used for soft combining is M, the number of PRB pairs obtained by dividing N by M (N/M) is located per subframe.

Figure 14:
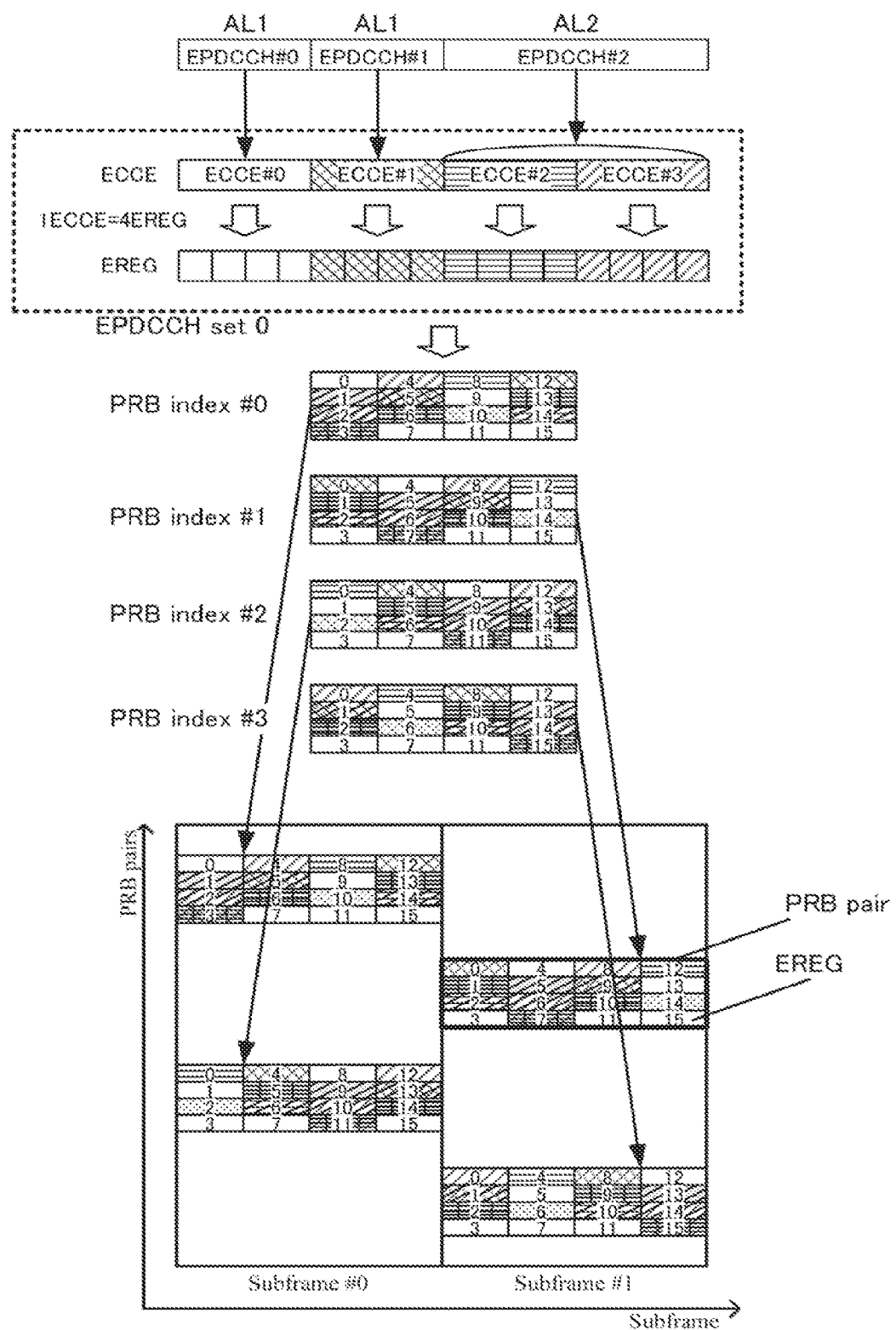
FIG. 14 is a diagram illustrating a configuration example of EPDCCH candidates according to Embodiment 3 of the claimed invention.

FIG. 14 illustrates an example in which soft combining of EPDCCH is performed using two subframes (M=2). In FIG. 14, the number of PRB pairs of the EPDCCH set is set equal to four (N=4). Accordingly, two PRB pairs (=N/M) are located per subframe in FIG. 14. In FIG. 14, the aggregation levels of EPDCCHs #0 and #1 are AL1, and the aggregation level of EPDCCH #2 is AL2. Moreover, each EPDCCH is located according to the assignment method of ECCEs in EPDCCH set 0.

In FIG. 14, EPDCCH #0 is located on ECCE #0, while EPDCCH #1 is located on ECCE #1, and EPDCCH #2 is located on ECCEs #2 and #3. Each ECCE is located on four PRB pairs of EPDCCH set 0 (e.g., PRB indices #0, #1, #2, and #3). However, PRB indices #0 and #2 are located in subframe #0, and PRB indices #1 and #3 are located in subframe #1 in FIG. 14. More specifically, single EPDCCH set 0 is located in a divided manner on a plurality of subframes to which soft combining is applied.

Accordingly, soft combining can be applied even when AL1 is used in Embodiment 3. In addition, since the amount of resource for the EPDCCH region per subframe used for soft combining can be reduced, the resource not used for EPDCCH can be used for PDSCH.

(Variation when N=8) FIG. 15 illustrates an example of a correspondence between ECCEs and PRB pairs when the number of PRB pairs of a search space set is eight (N=8), and the number of EREGs per ECCE is four. In FIG. 15, the PRB pairs on which ECCE is located vary depending on the ECCE. More specifically, an even number (index) ECCE is located on even number PRB pairs, and an odd number ECCE is located on odd number PRB pairs.

A description will be provided regarding variations 1 and 2 of dividing an EPDCCH set (PRB pairs) into a plurality of subframes (i.e., two subframes herein) used for soft combining in this case.

(Variation 1)

In Variation 1, in case of soft combining, subframes are separated into a subframe on which even number PRB pairs are located and a subframe on which odd number PRB pairs are located. For example, when soft combining is performed using two subframes, even number PRB pairs are located in the first subframe and odd number PRB pairs are located in the second sub frame.

Accordingly, EPDCCH at AL1 formed of single ECCE is located in one of the first and second subframes. To put it differently, no soft combining is applied to EPDCCH at AL1.

Thus, it is possible to switch between soft combining and non soft combining by selecting a certain AL.

As described above, soft combining can be applied using EPDCCH at AL2 or above in Variation 1. In this respect, Case 1 prepared from the number of EPDCCH candidates at AL2 (see, NPL 1) can be applied to all DCI formats in LTE-Advanced. Accordingly, soft combining can be applied to all EPDCCH candidates.

(Variation 2)

In Variation 2, in case of soft combining, a set of PRB pairs including an even number PRB pair and an odd number PRB pair is located in a single subframe. For example, when soft combining is performed using two subframes, a set of PRB pairs #0, #1, #4 and #5 is located in the first subframe, and a set of PRB pairs #2, #3, #6 and #7 is located in the second subframe in FIG. 15.

In this manner, even when EPDCCH at AL1 formed of single ECCE is used, EPDCCH is located in each of the first and second subframes. Accordingly, soft combining can be applied to EPDCCH at AL1. The variations of dividing an EPDCCH set (PRB pairs) for a plurality of subframes has been described.

As described above, according to Embodiment 3, resource allocation for locating EPDCCH when soft combining is applied can be appropriately configured as in Embodiment 2.

The embodiments of the claimed invention have been described.

Figures 16A, 16B:
FIGS. 16A and 16B are diagrams illustrating a configuration example of the number of EPDCCH candidates according to other embodiments of the claimed invention.

Other Embodiments (1) When soft combining is applied, the number of EPDCCH candidates for each AL may be changed. For example, FIG. 16A illustrates the number of EPDCCH candidates for each AL before any change is made, and FIG. 16B illustrates the number of EPDCCH candidates for each AL after some changes are made (for soft combining). In FIG. 16B, the number of EPDCCH candidates for the high AL (L=8) is increased while the number of EPDCCH candidates for the low AL (L=2) is decreased. The increase in the number of EPDCCH candidates for a high AL particularly increases the soft combining effects.

(2) Although the description has been given regarding the case where contiguous subframes are used as the subframes used soft combining as illustrated in FIGS. 7 and 8, for example, the subframes used for soft combining do not have to be necessarily contiguous, and non-contiguous subframes may be used.

(3) The precoding of DMRS in each subframe may be assumed to be the same depending on conditions when soft combining of EPDCCH is performed in Embodiments 2 and 3.

Examples of the conditions include a case where the PRB pairs on which EPDCCH to be soft combined are located are identical between the subframes. For example, in Embodiment 2 (Method 1), since the same EPDCCH set is used in a plurality of subframes used for soft combining, it is possible to assume that the precoding of DMRS is the same in the subframes.

Another example of the conditions is a case where the PRB pairs on which EPDCCH is located are arranged within a constant range in each subframe to which soft combining is applied, for example. The term "within a constant range" as used herein refers to adjacent PRB pair indices, for example.

Still another example of the conditions is a case where the PRB pairs on which EPDCCH is located are arranged within a PRB bundling range in each subframe to which soft combining is applied. The term "PRB bundling range" as used herein refers to a value that is determined according to the bandwidth and includes patterns of one, two, and three PRB pairs.

In Embodiment 3, the PRB pairs (positions) are always different between the plurality of subframes, and it is thus difficult to set the same precoding of DMRS in the subframes. In this respect, when Embodiment 3 is employed, the same PRB pairs may be used between the subframes used for soft combining. For example, in two subframes used for soft combining, the position of the PRB pair used in the second subframe may be shifted in such a way that the PRB pair used in the second subframe is identical with the PRB pair used in the first sub frame.

(4) In the embodiments described above, the cases where soft combining is performed over a plurality of subframes (i.e., in the time domain) have been described. However, the embodiments may be applied in the frequency domain (e.g., carrier aggregation). In this case, EPDCCH may be located over a plurality of component carriers (CCs) instead of locating EPDCCH on a plurality of subframes in the embodiments described above. In Embodiment 1, the PUCCH resource is implicitly indicated by the ECCE (index) of EPDCCH located in the last subframe among a plurality of subframes, for example. Meanwhile, the PUCCH resource may be implicitly indicated by the ECCE (index) of EPDCCH located on the PCell among a plurality of component carriers in case of carrier aggregation.

(5) Soft combining of EPDCCH in Embodiment 2 may be applied to two EPDCCH sets in the same subframe. In this configuration, the maximum AL in a single subframe can be made larger, and the reception quality of EPDCCH in a subframe having poor reception quality can be improved.

(6) The embodiments have been described by examples of hardware implementations, but the claimed invention can be also implemented by software in conjunction with hardware.

In addition, the functional blocks used in the descriptions of the embodiments are typically implemented as LSI devices, which are integrated circuits. The functional blocks may be formed as individual chips, or a part or all of the functional blocks may be integrated into a single chip. The term "LSI" is used herein, but the terms "IC," "system LSI," "super LSI" or "ultra LSI" may be used as well depending on the level of integration.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor, which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

A base station according to this disclosure includes: a configuration section that configures an Enhanced Physical Downlink Control Channel (EPDCCH) set in a plurality of subframes, the EPDCCH set being formed of Enhanced Control Channel Elements (ECCEs) to which control information transmitted over the plurality of subframes is assigned; and an assignment section that assigns the control information to any of the ECCEs on a Physical Resource Block (PRB) pair in each of the plurality of subframes.

In the base station according to this disclosure, the configuration section configures the EPDCCH sets respectively in the plurality of subframes, and the assignment section divides the control information into the same number of pieces of control information as the number of the plurality of subframes in units of the ECCEs and assigns each of the divided pieces of control information to any of the ECCEs forming the EPDCCH sets configured respectively in the plurality of subframes.

In the base station according to this disclosure, the EPDCCH sets configured respectively in the plurality of subframes are the same.

In the base station according to this disclosure, the EPDCCH sets configured respectively in the plurality of subframes are different.

In the base station according to this disclosure, configuration section configures the single EPDCCH set entirely for the plurality of subframes, and PRB pairs corresponding to the ECCEs forming the single EPDCCH set are distributedly located in the plurality of subframes.

In the base station according to this disclosure, the assignment section assigns downlink data to the last subframe among the plurality of subframes, the assignment of the downlink data being indicated by the control information.

The base station according to this disclosure further includes a reception section that receives response signals for downlink data on a Physical Uplink Control Channel (PUCCH) associated with the ECCE located in a subframe to which the downlink data is assigned among the plurality of subframes, the assignment of the downlink data being indicated by the control information.

In the base station according to this disclosure, a transmission subframe for the control information indicating assignment of uplink data is associated with a reception subframe for the uplink data, and the last subframe among the plurality of subframes is the same as the transmission subframe.

A terminal according to this disclosure includes: a configuration section that identifies Enhanced Control Channel Elements (ECCEs) to which control information transmitted over a plurality of subframes is assigned, the ECCEs forming an Enhanced Physical Downlink Control Channel (EPDCCH) set configured in the plurality of subframes; and a reception section that receives the control information assigned to any of the ECCEs on a Physical Resource Block (PRB) pair in each of the plurality of subframes.

A transmission method according to this disclosure includes: configuring an Enhanced Physical Downlink Control Channel (EPDCCH) set in a plurality of subframes, the EPDCCH set being formed of Enhanced Control Channel Elements (ECCEs) to which control information transmitted over the plurality of subframes is assigned; and transmitting the control information assigned to any of the ECCEs on a Physical Resource Block (PRB) pair in each of the plurality of subframes.

A reception method according to this disclosure includes: identifying Enhanced Control Channel Elements (ECCEs) to which control information transmitted over a plurality of subframes is assigned, the ECCEs forming an Enhanced Physical Downlink Control Channel (EPDCCH) set configured in the plurality of subframes; and receiving the control information assigned to any of the ECCEs on a Physical Resource Block (PRB) pair in each of the plurality of subframes.

INDUSTRIAL APPLICABILITY

The claimed invention is useful in mobile communication systems.

REFERENCE SIGNS LIST

100 Base station
200 Terminal
101 Assignment information generating section
102, 205 Configuration section
103, 207, Error correction coding section
104, 208 Modulation section
105, 209 Signal assignment section
106, 210 Transmission section
107, 201 Reception section
108, 203 Demodulation section
109, 204 Error correction decoding section
202 Signal demultiplexing section
206 Control signal receiving section

The invention claimed is:

1. A communication apparatus comprising:
a receiver, which, in operation, receives, a first control information relating to a set of downlink time domains, and which, in operation, receives in two or more than two downlink time domains of the set of downlink time domains a second control information used for a scheduling of a Physical Uplink Shared Channel (PUSCH); and
a transmitter, which, in operation, transmits the PUSCH in an uplink time domain, the uplink time domain being determined according to a last time domain of the set of downlink time domains.

2. The communication apparatus according to claim 1, wherein the receiver, in operation, receives
in two or more than two downlink time domains of another set of downlink time domains a third control information used for a scheduling of a Physical Downlink Shared Channel (PDSCH); and
receives the PDSCH in a downlink time domain based on the third control information, the downlink time domain being determined according to a last time domain of the other set of downlink time domains.

3. The communication apparatus according to claim 1, wherein:
the receiver, in operation, receives
in two or more than two downlink time domains of another set of downlink time domains a third control information used for a scheduling of a Physical Downlink Shared Channel (PDSCH); and
the PDSCH in a downlink time domain based on the third control information; and
the transmitter, which in operation, transmits ACK/NACK information indicating detection results of the PDSCH in an uplink time domain, the uplink time domain being determined according to a last time domain in which the PDSCH is transmitted.

4. The communication apparatus according to claim 1, wherein repetitions of the control information is mapped in a same Physical Resource Block (PRB) in each time domain of the set of downlink time domains.

5. The communication apparatus according to claim 3, wherein the ACK/NACK information is transmitted on a Physical Uplink Control Channel (PUCCH) resource associated with an Enhanced Control Channel Element (ECCE) index on which the other control information is mapped.

6. The communication apparatus according to claim 1, wherein a common precoding is used for the control information in the set of downlink time domains.

7. The communication apparatus according to claim 1, wherein repetitions of the control information is located in a resource region to which downlink data is assigned.

8. The communication apparatus according to claim 1, wherein the uplink time domain is four time domains after the last time domain of the set of downlink time domains in frequency-division duplex (FDD).

9. A communication method comprising:
receiving a first control information relating to a set of downlink time domains, and receiving, in two or more than two downlink time domains of the set of downlink time domains, a second control information used for a scheduling of a Physical Uplink Shared Channel (PUSCH); and
transmitting the PUSCH in an uplink time domain, the uplink time domain being determined according to a last time domain of the set of downlink time domains.

10. The communication method according to claim 9, comprising:
receiving, in two or more than two downlink time domains of another set of downlink time domains, a third control information used for a scheduling of a Physical Downlink Shared Channel (PDSCH); and
receiving the PDSCH in a downlink time domain based on the third control information, the downlink time domain being determined according to a last time domain of the other set of downlink time domains.

11. The communication method according to claim 9, comprising:
receiving, in two or more than two downlink time domains of another set of downlink time domains, a third control information used for a scheduling of a Physical Downlink Shared Channel (PDSCH);
receiving the PDSCH in a downlink time domain based on the third control information; and
transmitting ACK/NACK information indicating detection results of the PDSCH in an uplink time domain, the uplink time domain being determined according to a last time domain in which the PDSCH is transmitted.

12. The communication method according to claim 9, wherein repetitions of the control information is mapped in a same Physical Resource Block (PRB) in each time domain of the set of downlink time domains.

13. The communication method according to claim 11, wherein the ACK/NACK information is transmitted on a Physical Uplink Control Channel (PUCCH) resource associated with an Enhanced Control Channel Element (ECCE) index on which the other control information is mapped.

14. The communication method according to claim 9, wherein a common precoding is used for the control information in the set of downlink time domains.

15. The communication method according to claim 9, wherein repetitions of the control information is located in a resource region to which downlink data is assigned.

16. The communication method according to claim 9, wherein the uplink time domain is four time domains after the last time domain of the set of downlink time domains in frequency-division duplex (FDD).

17. An integrated circuit comprising:
reception circuitry, which, in operation, controls receiving, a first control information relating to a set of downlink time domains, and receiving in two or more than two downlink time domains of the set of downlink time domains a second control information used for a scheduling of a Physical Uplink Shared Channel (PUSCH); and
transmission circuitry, which, in operation, controls transmitting the PUSCH in an uplink time domain, the uplink time domain being determined according to a last time domain of the set of downlink time domains.

18. The integrated circuit according to claim 17, wherein the reception circuitry, in operation, controls
receiving, in two or more than two downlink time domains of another set of downlink time domains, repetitions of a third control information used for a scheduling of a Physical Downlink Shared Channel (PDSCH); and
receiving the PDSCH in a downlink time domain, the downlink time domain being determined according to a last time domain of the other set of downlink time domains.

19. The integrated circuit according to claim 17, wherein:
the reception circuitry, in operation, controls
receiving, in two or more than two downlink time domains of another set of downlink time domains, repetitions of a third control information used for a scheduling of a Physical Downlink Shared Channel (PDSCH); and
receiving the PDSCH in a downlink time domain; and
the transmission circuitry, in operation, controls transmitting ACK/NACK information indicating detection results of the PDSCH in an uplink time domain, the uplink time domain being determined according to a last time domain in which the PDSCH is transmitted.

20. The integrated circuit according to claim 19, wherein the ACK/NACK information is transmitted on a Physical Uplink Control Channel (PUCCH) resource associated with an Enhanced Control Channel Element (ECCE) index on which the other control information is mapped.

* * * * *